Nov. 19, 1968  F. H. TENNIS  3,411,536
PILOT OPERATED CONTROL VALVE MECHANISM
Filed July 6, 1966  8 Sheets-Sheet 1

INVENTOR.
Francis H. Tennis

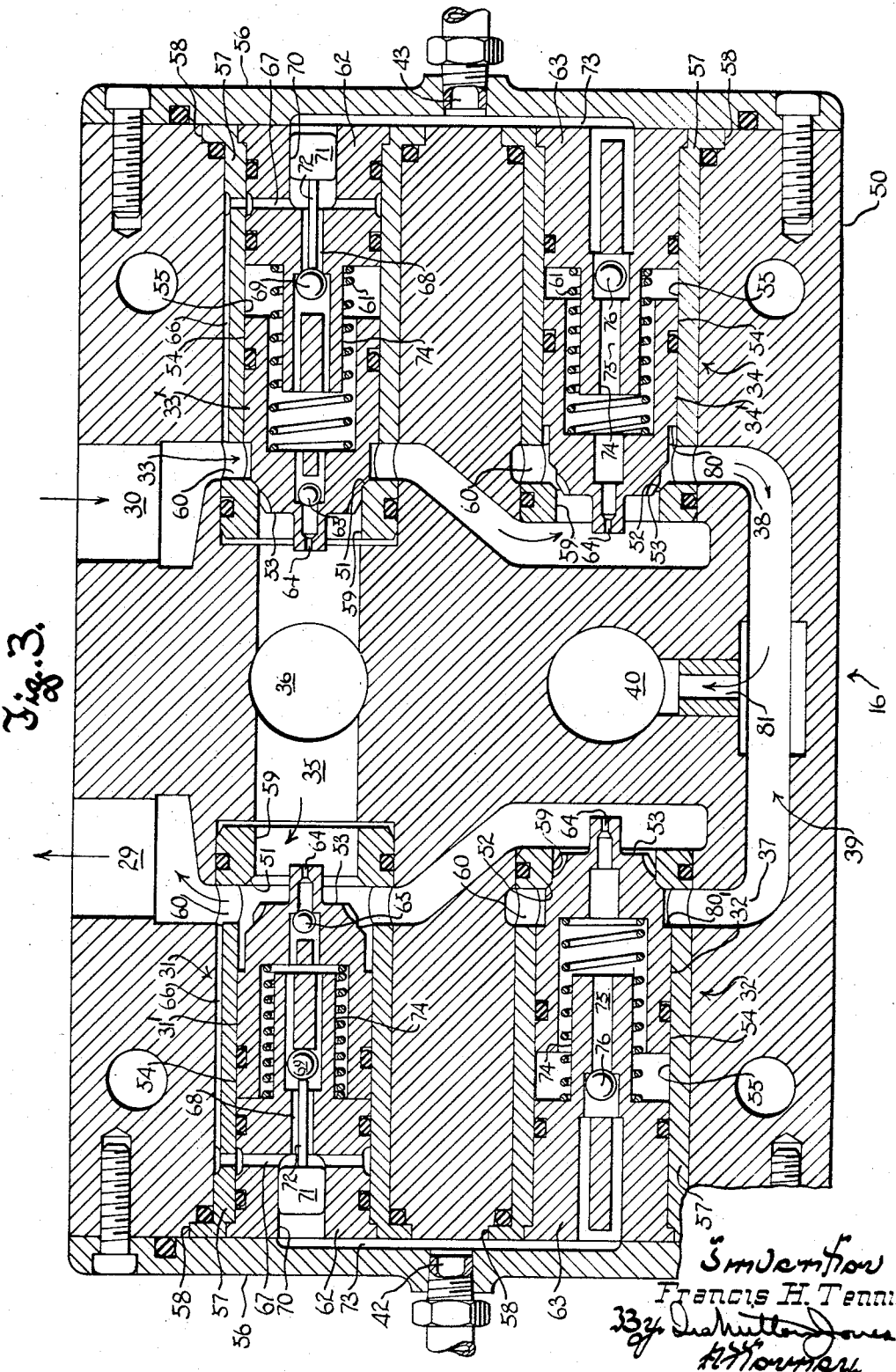

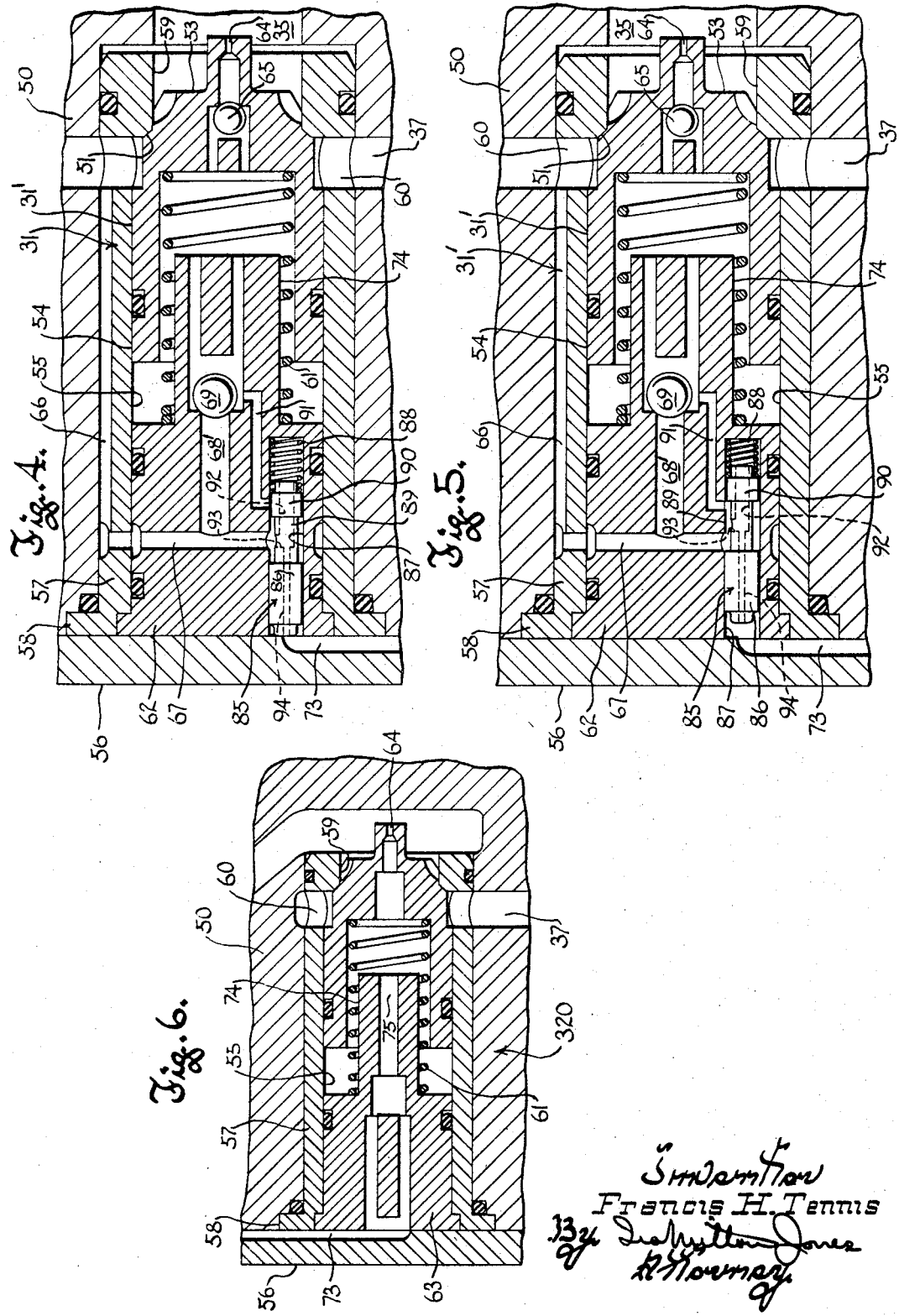

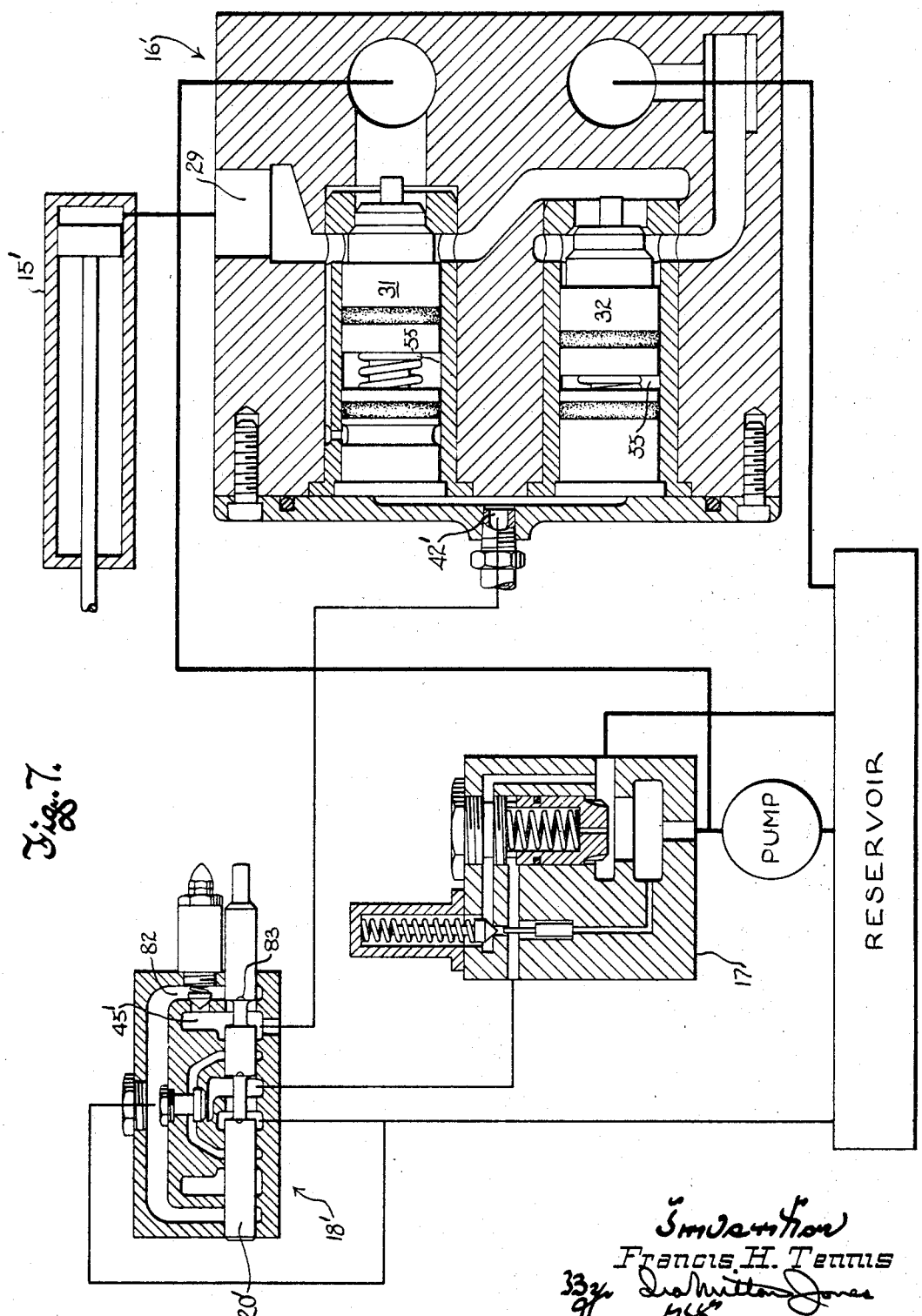

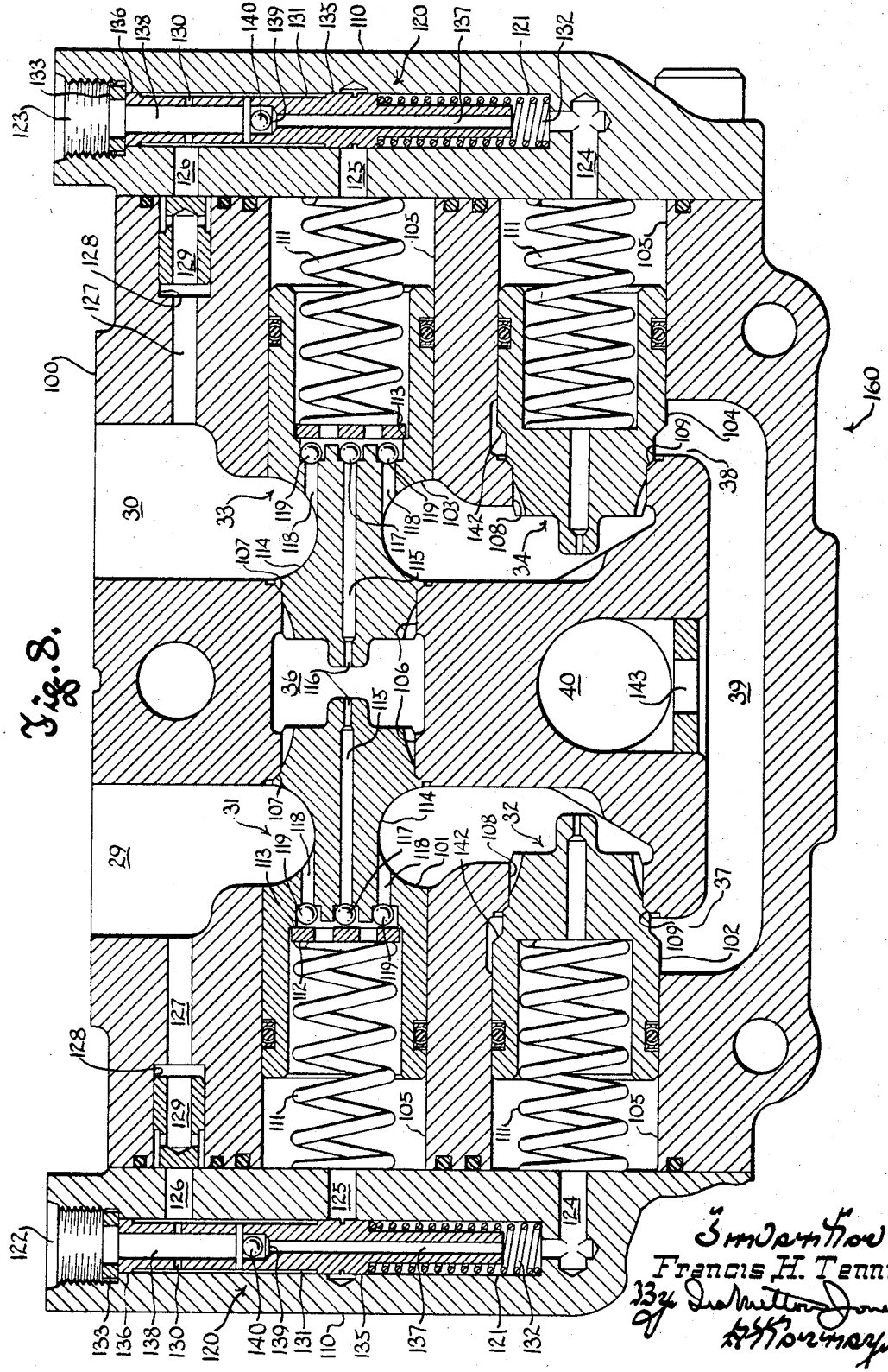

Nov. 19, 1968   F. H. TENNIS   3,411,536
PILOT OPERATED CONTROL VALVE MECHANISM
Filed July 6, 1966   8 Sheets-Sheet 7

Francis H. Tennis

INVENTOR
Francis H. Tennis

United States Patent Office

3,411,536
Patented Nov. 19, 1968

3,411,536
PILOT OPERATED CONTROL VALVE MECHANISM
Francis H. Tennis, Hartland, Wis., assignor, by mesne assignments, to Koehring Company, Milwaukee, Wis., a corporation of Wisconsin
Filed July 6, 1966, Ser. No. 563,196
45 Claims. (Cl. 137—596.15)

ABSTRACT OF THE DISCLOSURE

Fluid pressure actuatable supply and exhaust poppets control communication of a service line with either a supply line or an exhaust line. Depending upon pressure conditions at a pilot controlled port common to said poppets, either or both poppets can be held closed in response to the pressure of fluid obtaining in the service line, while the supply poppet can also be held closed by fluid in the supply line at a pressure exceeding that of fluid in the service line. Pressure fluid can also be delivered to the service line from the pilot controlled port in bypass relation to the supply poppet.

---

This invention relates to hydraulic control valves, and has more particular reference to improvements in pilot operated control valve mechanisms on the order of those disclosed in my Patent No. Re. 26,028 dated May 17, 1966.

A typical control valve mechanism of that patent comprises three main components, namely, a directional control valve unit for governing the direction of operation of a fluid motor, a bypass or speed control valve unit for governing the speed at which the motor operates, and a pilot valve for governing the operation of the directional and speed control valve units. This mechanism distinguishes from conventional pilot controlled valves primarily in that its directional control component is comprised of a plurality of hydraulically actuatable poppet-like supply and exhaust valve elements rather than a single shiftable valve element such as in a spool type control valve.

One pair of supply and exhaust valve elements is provided for each service line of a fluid motor governed by the valve mechanism. Hence, a directional control component for a single acting hydraulic cylinder requires but one pair of supply and exhaust valve elements, while two pairs of such valve elements are required in a directional control component intended for the control of a reversible fluid motor such as a double acting hydraulic cylinder.

The pilot valve effects opening and closing of the supply and exhaust valve elements by controlling the fluid pressure in a chamber with which each valve element is associated and from which fluid must be allowed to escape before the valve element can open.

In a directional control component of my aforesaid patent, intended for control of a double acting cylinder, one of the two service outlets of the pilot valve was communicated with the chamber for the supply valve element of one pair thereof and also with the chamber for the exhaust valve element of the other pair thereof. Similarly, the other service outlet of the pilot valve was communicated with the chambers of the remaining supply and exhaust valve elements. This required the directional control component to be provided with a separate pilot control port for each of the supply and exhaust valve elements incorporated therein. In addition, pressurized control fluid from the pilot valve had to be delivered to the chambers for the supply valve elements in order to actuate them to closed positions. In certain embodiments of the invention disclosed in my aforesaid patent, the exhaust valve elements were also held closed by pressurized control fluid from the pilot valve.

While the pilot operated control valve mechanism described above had many advantages over conventional spool type control valves, it was nevertheless subject to certain disadvantages, among which were the multiplicity of control ports needed in the directional control component, the limited control functions that could be achieved, and the necessity of providing more or less specialized pilot valves to meet different service requirements.

Hence, it is a primary objective of this invention to provide a pilot operated control valve mechanism of the character described with an improved directional control valve component which is not only controllable by any conventional control valve serving as a pilot, but which will also duplicate all of the control functions of a conventional control valve at the dictation of the pilot. Accordingly, any conventional control valve having neutral, raise, lower and float positions can be employed with the improved directional component of this invention to cause the poppet-like valve elements in the latter to effect the same control functions as the pilot.

It is a further purpose of this invention to provide an improved pilot controllable directional control valve unit of the character described, which provides for delivery of all pressure fluid from a source thereof to a fluid motor through a supply valve controlled service passage in the component; and which unit, with but slight modification, can function to effect delivery of pressurized control fluid to the motor from the pilot valve in bypass relation to the supply valve controlled service passage when the latter is closed, for precise inching of a load driven by the motor, or to effect delivery of pressure fluid to a motor from both the pilot valve and from the supply valve controlled service passage with the pilot valve supplying any desired amount of the fluid flowing to the motor up to a substantial percentage of the total.

It is a more specific object of the invention to provide a directional control component of the character described which features a novel supply valve element that can be held closed by the pressure of fluid in either the associated service line or in the supply line connecting with the component. This feature ideally adapts the component to stacking with similar components for control of a number of hydraulic motors or cylinders.

Still another object of this invention resides in the provision of a directional control unit having a service passage and supply and exhaust valve mechanisms associated therewith and with a common control port, and wherein instrumentalities associated with said valve mechanisms effect opening of the supply valve mechanism and closure of the exhaust valve mechanism in consequence of high pressure at the control port, and effect closure of the supply valve mechanism and opening of the exhaust valve mechanism in consequence of low pressure at the control port.

A further object of the invention resides in the provision of a directional control valve component such as described, with poppet-like exhaust valves which additionally serve as cylinder port relief valves.

With the above and other objects in view which will appear as the description proceeds, this invention resides in the novel construction, combination and arrangement of parts substantially as hereinafter described and more particularly defined by the appended claims, it being understood that such changes in the precise embodiments of the hereindisclosed invention may be made as come within the scope of the claims.

The accompanying drawings illustrate several complete examples of the physical embodiments of the invention, constructed according to the best modes so far devised for the practical application of the principles thereof, and in which:

FIGURE 3 is a sectional view similar to FIGURE 2, but showing the valve mechanisms of the directional control component in one operating position;

FIGURE 4 is an enlarged fragmentary sectional view showing a modified form of supply valve mechanism for the directional control component;

FIGURE 5 is a view similar to FIGURE 4 but showing one of the elements of the supply valve mechanism in another position;

FIGURE 6 is a fragmentary sectional view illustrating another type of exhaust valve mechanism for the directional control component;

FIGURE 7 is a view on the order of FIGURE 1 but showing how the control valve mechanism of this invention can be readily adapted for control of a single acting hydraulic cylinder;

FIGURE 8 is a sectional view of a modified directional control component;

Figure 1:
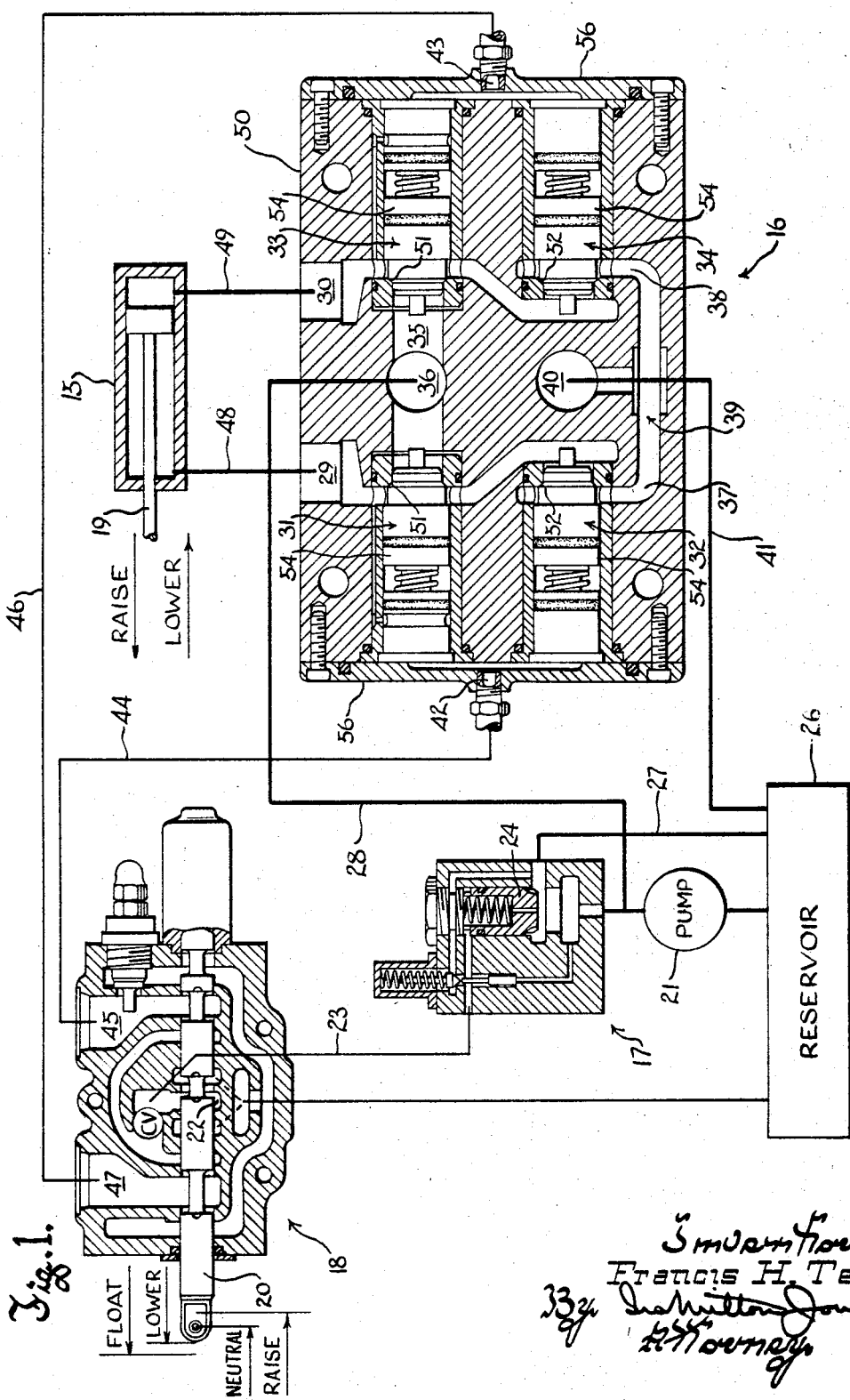
FIGURE 1 is a somewhat diagrammatic view of a control valve mechanism of this invention incorporated in a fluid pressure operated system comprising a reversible fluid motor.

Referring now to the accompanying drawings, FIGURE 1 somewhat diagrammatically illustrates how the speed and direction of operation of a reversible fluid motor such as a double acting cylinder 15 can be governed by control instrumentalities comprising a directional control unit 16, a speed control unit 17, and a pilot valve 18 that governs the operation of both the directional and speed control units.

Figure 2:
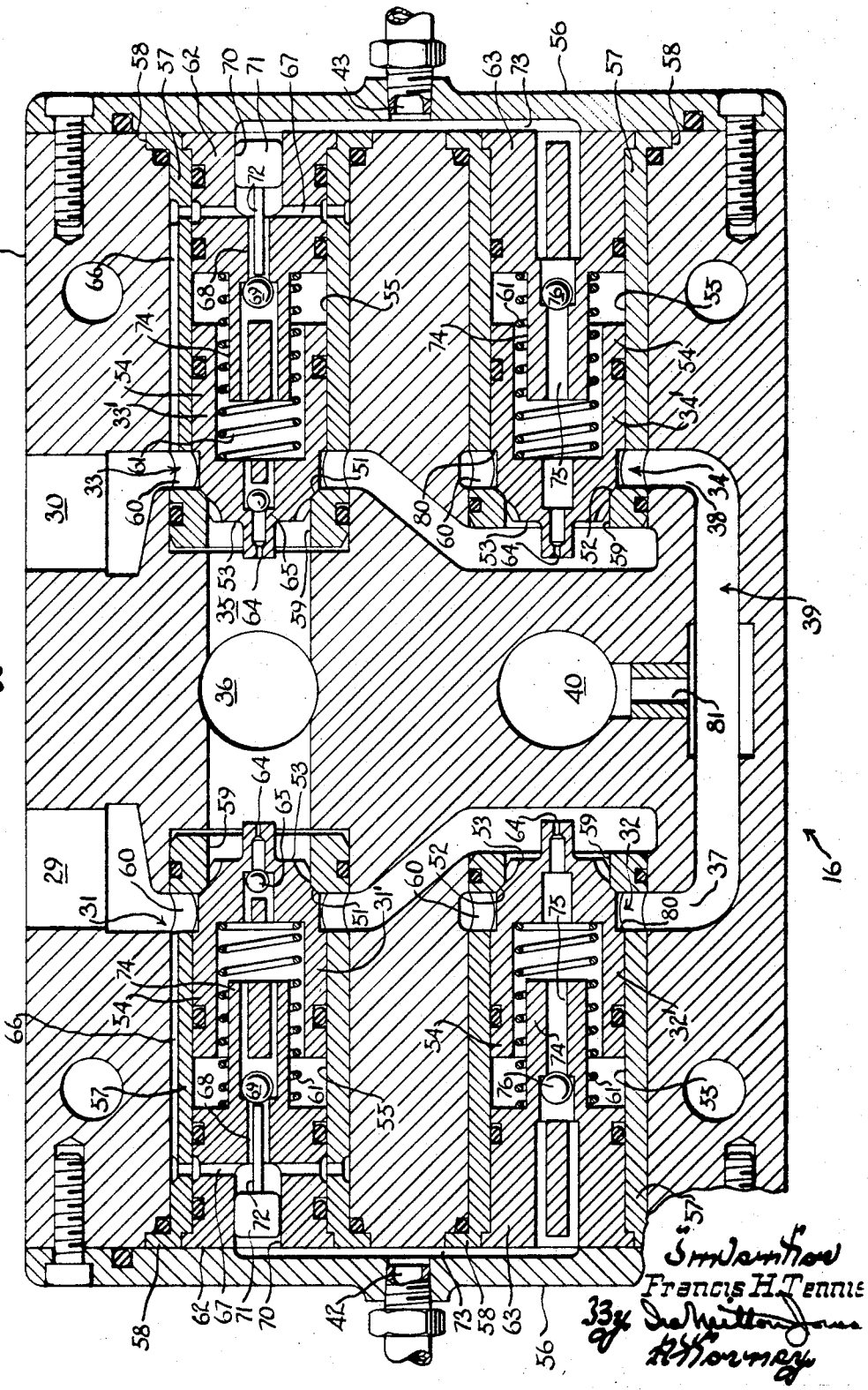
FIGURE 2 is an enlarged sectional view of the directional control component shown in FIGURE 1 but illustrating the poppet-like supply and exhaust valve mechanisms therein in greater detail and in their normally closed positions.

The pilot valve 18 has been shown as a conventional hydraulic control valve, preferably of small size and flow capacity for use with the directional control unit 16 illustrated in FIGURES 1 to 3, inclusive, which governs all flow of pressure fluid to the motor 15. In modified versions of the directional control unit to be discussed later, however, certain advantages can be gained through the use of a larger size pilot valve on the order of that seen in FIGURES 1 to 3.

The pilot valve shown by way of illustration in FIGURE 1, is of the double acting hold-in-neutral spool type, and it cooperates with the control unit 17 to govern the speed at which a load is driven by the piston rod 19 of the cylinder 15 in the same way as disclosed in my aforesaid Patent No. Re. 26,028. The pilot spool 20, when moved out of its neutral position shown, toward an operating position at either side of neutral, progressively closes off flow of control fluid from the pump 21 through an open center passage 22 in the pilot valve to cause a corresponding build up of back pressure at the pilot inlet. This back pressure is imposed upon the metering or bypass valve element 24 in the speed control unit 17 through the supply duct 23 connecting it with the pilot inlet, to cause the valve element 24 to close an extent proportional to closure of the open center passage in the pilot valve by its spool 20.

The bypass valve element 24, if not fully closed, allows output fluid from the pump to flow back to the reservoir 26 through a return line 27 in bypass relation to a main supply line 28 connecting with the outlet of the pump. Thus, by varying the amount of pump output fluid bypassed to the reservoir, regulation of the amount of pump fluid routed to the cylinder by the directional control unit 16, can be effected.

The way in which the directional control unit 16 is governed by the pilot valve is also similar to that disclosed in my aforesaid patent, but differs therefrom in certain important respects due to improvements in the unit 16 which are of the essence of this invention. In general, the pilot valve cooperates with the directional control unit 16 and with the speed control unit 17 to enable an operator to select the direction and speed of travel of the piston rod 19 in cylinder 15 so as to thus effect regulated extension and/or retraction of its piston rod and corresponding movement of a work load that may be connected thereto.

The following brief description of the directional control unit 16 and how it responds to actuation of the pilot valve to govern the direction in which the cylinder operates will be helpful to an appreciation of the more detailed discussion of the unit and its particular construction appearing hereinafter.

The directional control unit 16 has two service passages 29 and 30, a first pair of normally closed fluid pressure actuatable supply and exhaust valve mechanisms 31 and 32 associated with the service passage 29, and a second pair of normally closed fluid pressure actuatable supply and exhaust valve mechanisms 33 and 34 associated with the service passage 30 and identical to the first pair of valve mechanisms.

The supply valve mechanisms 31 and 33 control communication between the service passages 29 and 30 and a common supply passage 35 having an inlet port 36 connecting with the main supply line 28. The outlet valve mechanisms 32 and 34 control communication between the service passages and the branches 37–38 of a common U-shaped exhaust passage 39 having an outlet port 40 connecting with the reservoir through a return line 41.

The directional control unit 16 also has a first control port 42 which is associated with and common to the first pair of supply and exhaust valve mechanisms 31–32, and a second control port 43 common to the second pair of valve mechanisms 33–34. The control port 42 is connected by a control line 44 with the right hand service outlet 45 of the pilot valve, and the other control port 43 is connected by a control line 46 with the left hand service outlet 47 of the pilot.

When the pilot spool is shifted to a "lower" position located a first distance to the left of its neutral position shown, it blocks off the open center passage in the pilot to effect closure of the bypass valve element 24 in the speed control unit 17 to thus cause pump output fluid to flow to the inlet port 36 in the directional control unit; it effects diversion of pressurized control fluid entering the inlet of the pilot valve to its service outlet 45 for flow to the control port 42 in the directional control unit 16; and it also effects venting of the other control port 43 to the reservoir through the service outlet 47 in the pilot valve and the exhaust passages therein. As seen in FIGURE 3, such pressurization of the control port 42 effects opening of the supply valve mechanism 31 so that pressure fluid can flow to the service passage 29 from the supply passage 35, for delivery to the rod end of the cylinder 15 through a service line 48 to cause a load to be driven in one direction by the piston rod of the cylinder. At the same time, the venting of the other control port 43 effects opening of the exhaust valve mechanism 34, so that fluid expelled from the head end of the cylinder 15 can be returned to the reservoir via the service passage 30 and the service line 49 connected therewith.

If the pilot spool is shifted to the right of neutral to a "raise" position, it again effects closure of the bypass valve 24 in the speed control unit, but it then diverts pressurized control fluid entering the pilot valve to its service outlet 47 and pressurizes the control port 43. It also effects venting of the other control port 42 through the service outlet 45 of the pilot valve. This causes the supply valve mechanism 33 and the exhaust valve mechanism 32 to open, so that supply fluid then flows through the service passage 30 and line 49 to the head end of the cylinder 15, while fluid expelled from the rod end of the cylinder is returned to the reservoir through the line 48 and the other service passage 29.

If the pilot spool is shifted a second distance to the left of neutral to a "float" position, it connects both service outlets 45–47 and the open center passage 22 thereof with the reservoir, and accordingly vents both control ports 42 and 43 of the directional control unit 16. As a result, both of the supply valve mechanisms 31–33 remain closed while the exhaust valve mechanisms 32–34 can open to communicate the head and rod ends of the cylinder with one another and with the reservoir.

The directional control unit 16 of this invention can comprise a more or less rectangular metal body block 50 of substantially uniform thickness. The aforesaid inlet and outlet ports 36 and 40 are located in the body, one above the other and midway between the upright service passages 29–30, and they are formed as holes that can extend entirely through the body from one face thereof to the other if the unit is to be stacked with others like it to provide a valve bank. The supply passage 35 extends horizontally longthwise of the body, toward its opposite ends, and away from the inlet port 36. Its ends open to the service passages 29–30 through annular valve seats 51 which face outwardly, away from the inlet port.

The lower end portions of the service passages 29–30 are located at opposite sides of the outlet port 40, between the latter and their respective branches 37–38 of the U-shaped exhaust passage 39. The service passages communicate with their respective exhaust branches through annular valve seats 52 that are disposed on a common axis parallel to the axis of the inlet passage 35 and face outwardly, away from one another.

As in my aforesaid Patent No. Re. 26,028 the fluid pressure actuatable valve mechanisms 31, 32, 33 and 34 in the directional control unit 16 comprise poppet-like check valve elements 31', 32', 33' and 34', respectively, each formed as a hollow plunger having a forward or inner seat engaging end portion 53 and a larger diameter sleeve 54 on its outer or rear end portion. The outer or rear portion 54 of each valve element provides a piston actuator therefor, which is axially slidably received in a pressure chamber 55 that serves as a cylinder in which the piston operates.

The cylinders 55 for the supply check elements 31'–33' are located in the body coaxially of the inlet passage 35, and the check valve elements therein extend across their respective service passages 29–30 to have their inner end portions 53 normally engage the valve seats 51 at the opposite ends of the supply passage 35.

The cylinders 55 for the exhaust check elements 32'–34' are also located on a common axis, which axis is parallel to that of the supply check elements but spaced a distance therebelow. The exhaust check elements extend across their respective branches 37–38 of the exhaust passage 39, and similarly have their seat engaging ends in opposing relation and normally engaging their respective seats 52.

As will appear hereinafter, the supply check elements 31'–33' are unique in that while they can open like true check valves in response to the force which pressure fluid in the supply passage 35 exerts upon their inner ends, provided fluid is allowed to exhaust from their chambers 55, each is adapted to be held in a normally closed position engaging its seat 51 to close off communication between its service passage and the supply passage 35 in response to the higher of the fluid pressures obtaining in the service and supply passages.

The exhaust check elements 32'–34' are adapted to be normally held in closed positions engaging their seats in response to the pressure of fluid in their respective service passages, to block communication between them and the exhaust passage branches. In addition, each of the exhaust check elements is adapted to be opened, as a true check valve and provided fluid can exhaust from its pressure chamber 55, in response to pressure in its service passage; and it is also adapted to open as a reverse acting check valve at certain times, as will be later discussed, in response to pressure of fluid in its adjacent exhaust branch.

If desired, the supply and exhaust valve mechanisms 31, 32, 33 and 34 can be in the form of subassembled cartridges mounted in bores in the valve body and held in place by covers 56 secured to the opposite ends of the valve body. These cartridges comprise sleeves 57 each of which is suitably sealed in its bore at both its inner and outer end portion as by O-rings, and which has an outwardly directed flange 58 on its outer end that is clamped between portions of the body and the underside of the adjacent cover. The covers, therefore, hold the cartridges against axial shifting in their counterbores, with the inner end portions of the supply valve sleeves projecting across the adjacent service passages 29–30, and with the inner end portions of the exhaust valve sleeves projecting across their respective exhaust branches 37–38.

The valve seats 51–52 for the supply and exhaust valve mechanisms, respectively, are formed at the junctions between bores 59 which open to the inner ends of the sleeves, and counterbores which open to the outer ends of the sleeves and define the side walls of the pressure chambers 55. The bores 59 in the supply valve sleeves open directly to and form continuations of the supply passage 35; while those in the exhaust valve sleeves open directly to the lower end portions of the service passages 29–30.

The supply valve sleeves are provided with radial holes 60 located just behind the valve seats 51, through which the supply passage can be communicated with the service passages when their respective check valve elements 31'–33' are unseated. The exhaust valve sleeves are similarly provided with radial holes 60 which communicate the service passages with their respective exhaust branches when the exhaust check elements 32'–34' are unseated.

The check valve elements are yieldingly biased forwardly toward closed position by coiled expansion springs 61 reacting against spring seat members 62 for the supply valve mechanisms, and 63 for the exhaust valve mechanisms. The spring seat members are sealed in their respective cartridge sleeves and anchored in their outer end portions by the covers 56; and they serve to close the outer ends of the chambers 55 in which the check valve elements operate.

Each of the check valve elements has a restricted inlet passage 64 leading to its pressure chamber 55 and extending coaxially through the inner end portion of the valve element. These passages communicate the inlet passage 35 with the pressure chambers of the supply valve elements 31'–33', and they communicate the chambers for the exhaust valve elements 32'–34' with their respective service passages. A ball check valve 65 confined in a widened portion of the inlet passage 64 of each supply check element 31'–33' provides for flow to its pressure chamber pressure fluid from the supply passage 35 but prevents pressure fluid in its chamber from flowing back out to the supply passage.

The opening force exerted upon the inner end of each supply check element 31'–33' by pressure fluid in the supply passage 35 will unseat the supply check element only at times when the pressure of fluid in its associated service passage is exceeded by the pressure of fluid in the supply passage 35, provided, however, that pressure fluid can escape from the cylinder space or pressure chamber 55 behind the supply check element.

For this purpose, the cylinder 55 containing each supply check element 31'–33' is communicated with the adjacent service passage by means of a passageway provided by a number of connecting passages. One branch 66 of these connecting passages has been shown as provided by a longitudinal groove in the exterior of the cartridge sleeve and leads outwardly from near the outlet of the service passage to a second branch 67 which extends radially inwardly therefrom and joins with an axial branch 68 in the adjacent spring seat member, coaxial with the supply check element and opening forwardly to its cylinder through a counterbore containing a ball check 69. The ball checks 69 open forwardly to let pressure fluid flow into the cylinders 55 from their respective service passages but close to prevent reverse flow back to the service passages.

The axial passage 68 associated with each supply check element 31'–33' also opens rearwardly to a counterbore 70 the mouth of which is closed by the adjacent cover 56. Each of the last named counterbores 70 provides a small cylinder containing an axially slidable plunger 71 having a stem 72 projecting axially inwardly toward the ball check 69 and adapted to unseat the same upon inward motion of the plunger in response to pressure in the mouth of its counterbore.

The cover 56 which is associated with the valve mechanism 31 has the control port 42 formed therein, and the other cover contains the control port 43. A groove 73 in the underside of each cover defines a passage communicating the mouth of each of the cylinders 70 with its associated control port, so that the cylinder can either be pressurized or vented at the dictate of the pilot valve.

It should be observed that the spring 61 for each of the check valve elements not only bears against the inner face of its spring seat member, but also encircles a stem 74 thereon which projects axially forwardly therefrom. The stems 74 are formed with the counterbores containing the ball checks 69 for the two supply valve mechanisms 31' and 33'; while the stems on the seat members for the two exhaust check valves 32'–34' are formed with check valve controlled passages 75 that lead rearwardly through the seat members to communicate the adjacent cover grooves 73 with the exhaust check chambers 55. Rearwardly opening ball check valves 76 are located in the last designated stem passages, to allow only exhaust flow of fluid from the exhaust check chambers to their respective control ports when the latter are vented through the pilot valve.

From the description thus far, it will be apparent that when the spool 20 of the pilot valve is in its neutral position seen in FIGURE 1, control fluid entering its inlet can flow freely through the open center passage thereof and return to the reservoir; and both service outlets 45–47 thereof are closed off from both the inlet and the exhaust outlet of the valve. Accordingly, the pump will be unloaded through the speed control unit 17, and no pressurized fluid can flow to the control ports 42–43 in the directional control unit 16. Since the inlet 36 of the directional control unit will be at reservoir pressure at this time, fluid under pressure from the service passages 29–30 can flow through the branch passages 66, 67 and 68 to fill the cylinders 55 in which the supply check elements 31'–33' operate to hold the same closed.

The pilot spool 20, in its first operating position to the left of neutral, causes the check valve elements to assume the positions seen in FIGURE 3. The pilot spool blocks the open center passage 22 in the pilot so as to effect closure of the bypass or speed control valve element 24; and it diverts control fluid under pressure to the service outlet 45 and via the control line 44 to the control port 42. This results in unseating of the ball check 69 by the plunger 71 in the supply valve mechanism 31 to thus provide for exhaust of fluid from its cylinder 55 to the adjacent service passage 29. The supply check 31' can then open under force which pressure fluid in the supply passage 35 exerts on its reduced inner end 53, as soon as the pressure in the supply passage builds up to a value exceeding the pressure of fluid in the adjacent service passage 29. Fluid expelled from the cylinder 55 behind the valve 31' is led to the service passage 29 through the seat vacated by the ball check 69, and branch passages 68, 67 and 66. It should be observed that fluid can be expelled from the cylinder 55 at a rate faster than supply fluid can enter the cylinder through the restricted passage 64 in the inner end of the supply check element 31'.

As soon as the supply check 31' opens, supply fluid flows through service passage 29 and line 48 to the rod end of the cylinder to lower and load connected with its piston rod.

The other supply check element 33' remains closed when the pilot spool is in the "lower" position described. Its control port 43 is then vented through the service outlet 47 in the pilot valve, and its ball check 69 is closed to cause fluid in its cylinder 55 to be maintained at the same pressure as obtains in the supply passage 35 and thereby hold the supply check element 33' on its seat.

Shifting of the pilot spool to its "raise" position to the left of neutral similarly effects opening of the supply check 33' and closure of the supply check 31'.

The chambers 55 for the exhaust check elements 32'–34' are at all times communicated with their respective service passages 29–30 through the restricted inlet passages 64 in the check elements. Hence, fluid in those chambers can be maintained at the same pressure as fluid in their respective service passages, to hold the exhaust check elements closed as long as their respective control ports 42'–43 are not vented through the pilot valve. When the pilot valve vents either control port, fluid in the chamber for the associated exhaust check is free to flow to the reservoir and thus allow the exhaust check therein to be unseated under the opening force exerted upon its forward end by pressure fluid in the adjacent service passage.

Hence, with the control spool 20 of the pilot valve in its "lower" position described, the control port 42 is pressurized by control fluid from the pilot outlet 45, while the control port 43 is vented through the other service outlet 47 of the pilot valve. Consequently, the exhaust check 34' will open, as seen in FIGURE 3, under the force which exhaust fluid from the head end of the cylinder 15 exerts upon its forward end as it is returned to the service passage 30 in the directional control unit 16. Control fluid under pressure at port 42, however, acts upon the ball check 76 for the other exhaust check 32' to hold it in closed position and thus prevent control fluid from flowing through the exhaust check to service passage 29. Ball check 76 of exhaust check 32' thus serves to trap pressure fluid from the adjacent service passage 29 in its chamber 55 to cause said exhaust check to remain closed against the opening force which pressure fluid in the adjacent service passage 29 exerts upon its reduced front end during lowering of the load driven by the cylinder.

From this, it will be apparent that the positions of the two exhaust check valves will be the reverse of that seen in FIGURE 3 when the pilot spool is in its "raise" position.

Because of the above described characteristics of the supply and exhaust valve mechanisms, pressurization of either control port 42 or 43 will effect opening of its associated supply check valve and closure of its associated exhaust check valve, while venting of either control port will effect closure of its associated supply check valve and opening of the associated exhaust check valve. In each case, one side of the work cylinder will be communicated with the supply passage 35 in the directional control unit 16 while the other side will be communicated with the exhaust passage 39 in the unit.

In the float position of the pilot spool 20, both control ports 42–43 and the inlet 36 of the directional control unit are vented to the reservoir. The two supply checks 31'–33' in the the directional control unit, however, can remain closed under force derived from pressure fluid in the service passages 29–30, which communicate with the chambers 55 of the supply checks. Either of the exhaust checks 32'–34', however, will then be free to open in response to load pressurized fluid in its associated service passage to allow such fluid to flow to the exhaust passage 39 where it can also exert force on an external annular shoulder 80 on the other exhaust check to open the same. A restriction 81 in a branch passage connecting the exhaust passage 39 with the outlet 40 can be employed if desired, to cause the pressure of fluid entering the exhaust passage at such times to build up somewhat to a value that assures prompt opening of the downstream exhaust valve. As will be appreciated, the restriction 81 can be provided by a reverse acting check valve in the manner disclosed in my Patent No. 3,134,402, issued May 26, 1964.

It is important to note that in the float position of the pilot spool, the two supply checks 31'–33' in the directional control unit can be maintained closed under force derived from pressure fluid in either of their respective service passages 29–30, or in the supply passage 35, whichever is higher. For example, the directional control unit may be functioning to achieve the float operation described, while one or more directional control units stacked therewith may be in either raise or lower operation to cause pressurization of their common inlet 36. In that case, the supply passages of all the stacked directional control units will be pressurized to supply the pressure needed for cylinder operation as well as for maintaining the supply checks of a float operating unit closed.

FIGURE 7 illustrates how a single acting lift cylinder 15' can be controlled by a directional control unit 16' having only one pair of supply and exhaust valve mechanisms 31 and 32, and having its service passage 29 connecting with the head end of the cylinder. The unit 16' has a single control port 42' which can be connected to a service outlet 45' of a simple pilot valve 18'. As is believed obvious, the check valve elements of both the supply and exhaust mechanisms 31–32 will remain closed in the neutral position of the pilot spool 20' at which its service outlet 45' is closed off from both the pilot inlet and from the pilot exhaust passage. This results from the pressure of fluid trapped in the chambers 55 in which the supply and exhaust check valve elements operate. The supply valve mechanism 31, however, will open in response to pressurization of the control port 42' when the pilot spool 20' is moved to a "raise" position to the left of its neutral position, to allow supply fluid to flow through the service passage 29 to the head end of the cylinder. The exhaust valve mechanism 32 will remain closed at that time because of the pressure at the control port 42'.

The control port 42' will be vented when the pilot spool 20' is shifted to a "lower" position to the right of neutral, to allow the exhaust valve mechanism 32 to open. At such times, the supply valve chamber 55 is pressurized by the exhaust fluid in the service passage 29 and the supply valve mechanism 31 is held closed thereby. Hence, fluid then exhausts from the head end of the cylinder 15', and the load connected to its piston rod will be lowered by gravity.

FIGURE 7 illustrates a feature of the invention that is common to the single acting control mechanism therein shown as well as to the double acting control mechanism described previously. This feature resides in providing for controlled descent of the load on the cylinder 15', by restricting communication between the service outlet 45' of the pilot valve and the pilot exhaust passage 82 through one or more metering notches 83 in the pilot spool 20'. Thus, when the spool 20' is in a metering "lower" position such as shown in FIGURE 7, the exhaust valve mechanism can open only part way, due to the fact that restricted communication between its pressure chamber and the exhaust passage 82 in the pilot valve allows pressure of fluid in its pressure chamber to resist the opening force which fluid in the service passage 29 exerts upon the front end of the exhaust check valve element. Accordingly, fluid exhausting from the cylinder 15' must flow through the restriction provided by the part way open exhaust valve mechanism 32, thus slowing the descent of the load on the cylinder. From this it will be appreciated that the exhaust check valve mechanism 32 can be caused to open to a number of different settings under the control of the pilot spool 20', in order to regulate the descent of the load on the cylinder 15'.

If desired, the exhaust of fluid from the pressure chambers of each of the supply valve mechanisms described can be controlled by a plunger mechanism 85, such as seen in FIGURES 4 and 5, as an alternative to the ball check unseating plungers 71. The plunger mechanism 85 has two main functions, namely to effect exhaust of fluid from its chamber 55 in response to pressurization of the associated control port, and to also relieve the chamber of fluid at excessively high pressures that may be trapped therein at times when the pilot spool is in its neutral or hold position. Most commonly, these excessively high pressures result from suddenly stopping a heavy descending load on the work cylinder by return of the pilot spool to its neutral position. This produces an extremely high shock pressure in the cylinder head connected service passage and the chamber 55 of the associated supply valve mechanism, where it would ordinarily be maintained by the ball check 69 despite the fact that the pressure in the head end of the cylinder might have thereafter quickly returned to a normally high value.

Shock pressures of this nature can also occur in the boom cylinder of a front end loader, to cite another example, as when the pilot spool is in its neutral position holding the boom elevated while the loader is run over bumpy ground from one location to another. The boom then tends to "bounce" up and down and generate excessively high pressures in the head end of its work cylinder each time its downward motion is arrested by the column of hydraulic fluid in that part of the service line which extends from the cylinder head to the seat 51 for the associated supply valve mechanism.

Since the head connected service passage is communicated with the pressure chamber 55 of the associated supply valve mechanism, the pressure of fluid in the chamber will rise to the same excessively high degree as in the service passage, and the ball check 69 would retain the high pressure and prevent opening of the supply valve mechanism if it were not for the plunger mechanism 85 now about to be described.

The plunger mechanism 85 can be built into the spring seat member 62 of the supply valve mechanism as shown, and comprises a small diameter fluid pressure responsive plunger 86 that is axially slidable in a bore 87 in the spring seat member parallel to but spaced to one side of the axis of the central passage 68' in the spring seat member. The passage 68' in this case terminates at its junction with the radial passage 67. The outer end of the bore 87 opens to the underside of the adjacent cover 56 and is in communication with the control port thereof through the groove 73 in the underside of the cover. A spring 88 in the inner end of the bore yieldingly holds the plunger in a normal position engaging the underside of the cover, and at which a reduced medial portion 89 of the plunger is in register with the radial passage 67 in the spring seat member.

The plunger 86 has lands on its opposite end portions. The land 90 on the inner end of the plunger normally lies directly opposite the mouth of a bypass 91 that communicates with the pressure chamber 55, and is slightly reduced to loosely fit the bore and allow fluid from the chamber 55 to leak out to the radial passage 67 and thus relieve an excessively high shock pressure condition in the chamber. Fluid can thus bleed off from the chamber to the adjacent service passage even though the ball check 69 remains seated provided, of course, that pressure conditions in the service passage have returned to normal. Thus, there is no danger that the supply valve mechanism will fail to open in response to pressurization of its control port, as could otherwise happen with the mechanism seen in FIGURES 2 and 3 if the ball check 69 was held closed by a force exceeding the opening force that could be applied thereto by plunger 71.

The plunger 86 is hollow to provide an axial passage 92 therethrough that allows relatively free sliding of the plunger toward and from the closed inner end of its bore. This passage opens laterally to the reduced medial portion 89 of the plunger as at 93, and also to its outer end through a restricted passageway 94.

From this it will be seen that the plunger 86 will move in response to pressurization of its associated control port, from its normal position seen in FIGURE 4 to an actuated position seen in FIGURE 5, at which its land 90 clears the mouth of the bypass 91 so as to vent its chamber 55 in bypass relation to the ball check 69, through the bypass 91, radial passage 67 and axial passage 66 leading to the associated service passage. This allows the supply valve mechanism to open under the force which pressure fluid in the supply passage 35 exerts upon its inner end.

Another highly important feature of the plunger mechanism 85 described, is that it provides for the supply of small amounts of hydraulic fluid to the hydraulic cylinder without necessity for opening of any of the supply valve mechanisms in the directional control unit, for so-called precise inching of a load driven by the cylinder. Such inching can be accomplished by moving the spool of the pilot valve (like that of FIGURE 1) to a conventional metering position part way between neutral and one of its operating positions, to cause a limited amount of control fluid to flow from the pilot inlet to a selected one of the control ports of the directional control unit 16, at a pressure below that required for actuation of the plunger 86 of the plunger mechanism 85, and to cause a correspondingly limited amount of return fluid to flow from the other control port to the exhaust passages in the pilot valve. Such pressurized control fluid will then flow through the restricted passage 94 in the plunger 86 to the radial passage 67, and via the connecting passage 66 to the associated service passage and the end of the cylinder connecting therewith. The small amount of pressure fluid expelled from the cylinder during inching is led to the reservoir through the central passage in the appropriate exhaust valve mechanism, the control port associated therewith, and the exhaust passages in the pilot valve. The cooperating supply and exhaust valve mechanisms will remain in their closed positions during such inching control of a load driven by the governed cylinder.

Inching of the load can also be accomplished by directing pressurized control fluid from the pilot valve to either single or double acting cylinders through the central passages in their exhaust valve mechanisms if the latter are constructed as shown in FIGURE 6. The exhaust valve mechanism 320 therein shown is exactly like the mechanism 32 seen in FIGURES 2 and 3, except that the ball check 76 has been eliminated. The ball check 76 can be dispensed with in many instances without interfering with proper operation of the associated exhaust check element, since the latter will still open only at times when its control port is vented through the pilot valve. It will remain closed at times when its control port is pressurized to effect opening of the associated supply valve mechanism, due to the fact that control fluid under pressure will then flow into its chamber 55 and act upon the rear of the exhaust check element to hold it closed with a force that is only slightly diminished by reason of the restricted inlet 64 in the front of the exhaust check element.

From the description thus far, it will be apparent that a hydraulic motor such as the cylinder illustrated can be supplied with pressure fluid from the main supply line alone, or from an auxiliary supply line leading from the pilot valve, for inching purposes. It will thus also be apparent that the motor can be supplied with pressure fluid from both the main and auxiliary supply lines with the embodiments of the invention shown in FIGURES 4, 5 and 6, to increase the total flow to the motor whenever desired. This results from the fact that pressure fluid entering either pilot control port 42 or 43 is always able to flow to its associated service passage through the passages 93 and 94 in plunger 85 in either its FIGURE 4 or FIGURE 5 position; or in the FIGURE 6 embodiment, such pressurized control fluid can always flow through the interior of the exhaust check element to the service passage associated therewith.

Thus, by simple enlargements of the passages 93–94, or of the restricted passage 64 in the exhaust check element, a pilot valve of larger size and flow capacity can be used to advantage to supply inching fluid alone to the cylinder, or to augment the flow of fluid to the cylinder from the main supply line by any desired amount of auxiliary supply fluid so as to greatly extend the control capabilities of the pilot and directional control units.

FIGURE 8 illustrates a slightly different form of directional control unit 160 that can be employed to govern the direction of operation of a double acting hydraulic cylinder at the dictate of either a small pilot valve like that seen in FIGURE 1, or any larger capacity pilot valve of the same type. The body 100 and main passage arrangement of the directional control unit is generally like that of FIGURE 1, and it is similarly provided with a first pair of supply and exhaust valve mechanisms 31 and 32 that comprise check valve elements 101 and 102, respectively, associated with the service passage 29; and a second pair of supply and exhaust valve mechanisms 33 and 34 that comprises check valve elements 103 and 104, respectively, associated with the other service passage 30.

The large diameter rear portion of each of the tubular check valve elements is slidably received in a bore 105 in the valve body that opens outwardly to its exterior. The bores containing the supply check elements open inwardly to the adjacent service passage, while the bores containing the exhaust check elements open to the adjacent exhaust branches 37–38. The reduced inner or forward ends of the supply check elements are normally received in coaxial bores 106 that communicate the adjacent service passages 29–30 with the inlet port 36 therebetween, and they normally engage seats 107 formed directly on the body 100, at the junction of the bores 106 with the adjacent service passages 29–30.

Similarly, the reduced inner or forward ends of the exhaust check elements 102–104 are normally received in coaxial bores 108 in the partition walls separating each service passage 29–30 from the adjacent branch 37–38 of the exhaust passage 39, and their seats 109 are also formed directly on the valve body at the junction of the bores 108 with the adjacent exhaust branches 37–38.

End covers 110 which are somewhat thicker than the covers 56 previously described, are detachably secured to the opposite ends of the valve body to close the bores 105, so that the outer portions of the latter provide pressure chambers for their respective check valve elements. The springs 111 for the check valve elements seat directly against the covers 110, and extend inwardly into the wells defined by the tubular rear portions of the check valve elements to bias the same forwardly onto their respective seats. Each supply check spring bears upon an apertured ball check retaining disc 112 and holds it seated upon an annular outwardly facing ledge 113 at the bottom of the well therein.

Each supply check element 101–103 is formed with a substantially deep circumferential groove 114 in its exterior to normally align with its associated service passage. A central passage 115 extends axially through the forward portion of each supply check and opens to its forward end through a restriction 116. At its rear, the passage 115 opens to a counterbore containing a ball check 117 inwardly of the retaining disc 112. The ball check 117 opens toward the disc to allow fluid from the inlet port 36 to flow into the pressure chamber 105 for the supply check element, but closes to block reverse flow from the chamber to the inlet port.

Each supply check element is provided with one or more similar ball check controlled axial passages 118, which provide inlets for its pressure chamber that allow pressure fluid from the adjacent service passage to flow thereinto. The inner ends of the passages 118 open to the groove 114 in each supply check element, while their rear or outer ends open to counterbores containing ball checks 119, inwardly of the disc 112.

Hence, the chamber 105 for each supply check valve can be maintained at either the pressure of fluid at the inlet port 36, or at the pressure of fluid in the adjacent service passage, depending upon whichever pressure is higher, to cause the supply valve element therein to be held firmly engaged with its seat and against opening until the chamber 105 is vented.

The exhaust check elements 102–104 can be substantially identical to those described earlier. They are also adapted to be held closed by the pressure of fluid in their respective chambers 105, admitted thereto from the adjacent service passages, as long as their chambers are not vented through the pilot valve.

Each of the covers 110 contains a plunger mechanism 120 that is adapted to control the exhaust of pressure fluid from the chambers of the adjacent pair of supply and exhaust check valves at the dictate of the pilot valve. These plunger mechanisms 120 are mounted in elongated vertical bores 121 the open upper ends of which provide control ports 122 and 123, one for each pair of supply and exhaust valve mechanisms. The lower ends of the bores 121 communicate with the pressure chambers 105 of the exhaust check elements through lateral passages 124 in the covers. Similarly, a lateral passage 125 in each cover communicates its bore 121 with the adjacent supply valve chamber 105.

A third lateral passage 126 in each cover, above the passage 125, communicates its bore 121 with a passage 127 leading to the adjacent service passage. The passages 126 and 127 are coaxial and open to the opposite ends of a counterbore 128 in the body, containing a check valve plunger 129 that opens away from the cover to enable fluid in its bore 121 to flow to the adjacent service passage. The check valve plunger closes the adjacent mouth of the passage 126 to prevent reverse flow to the bore, from the adjacent service passage.

Control fluid under pressure from the pilot valve, when delivered to either control port 122 or 123 to effect opening of one or the other of the supply valve mechanisms, can always flow into its associated bore 121 in an amount determined by the size of ports 130 in the wall of a tubular plunger 131 in the bore, past the associated check plunger 129 and to the associated service passage via the passage 127 to augment the flow of pressure fluid to that service passage from the main supply line.

Each plunger 131 is biased upwardly by a spring 132 to a normal position shown, at which its upper end engages a stop washer 133 confined in the bottom of the control port. In addition, each of the tubular plungers 131 substantially clears the wall of its bore 121 except for a medially located land 135 thereon which, however, does not have a fluid tight fit in the bore but allows for some leakage of pressure fluid past its exterior. The land 135 cooperates with a closer fitting land 136 at the upper end of the plunger to guide the plunger for up and down motion in its bore.

The lands 135 on the plungers normally lie directly opposite the mouths of the lateral passages 125 which connect with the pressure chambers 105 of the two supply check elements 101–103, and thus serve to substantially block the exhaust of pressure fluid from the chambers 105 through the passages 125 except when the plungers are moved downwardly. Pressure fluid selectively directed into the control ports 122–123 by the pilot valve acts upon one or the other of the plungers to move it downwardly in its bore to a relief position at which its land 135 uncovers the outlet 125 for the pressure chamber 105 of its associated supply check element 101 or 103, to thus allow that supply check element to open under the force which pressure fluid at the inlet 36 exerts upon its reduced inner end. When either supply check opens in this manner, fluid expelled from its chamber 105 flows through the adjacent bore 121, along the exterior of the plunger 131 therein to the passage 126, past the check plunger 129 to passage 127, and then to the associated service passage.

It will be appreciated, of course, that the plungers 131, when moved part way toward their relief positions to restrict the flow of fluid out of the chambers 105 of their respective supply check elements, will effect only partial opening of the latter for metering of the flow of supply fluid to the service passages controlled thereby. The downward response of the plungers, in turn, is controlled by the pilot spool through regulation of the pressure at the control ports.

The chambers for the exhaust check elements 102–104 are vented through the interiors of the tubular plungers 131, which provide small diameter passages 137 in the lower portions of the plungers and larger diameter passages 138 in the upper portions of the plungers. Each of the lower passages 137 opens upwardly to its larger passage 138 through a valve seat 139 below the restricted ports 130, and upon which a ball check 140 is adapted to seat to prevent pressurized control fluid entering the adjacent control port from flowing to the chamber 105 for the associated exhaust check element. Fluid in the exhaust chambers 105, however, is free to flow past the ball checks 140 for return to the reservoir whenever the control ports are vented by the pilot valve spool, so as to allow one or the other of the exhaust check elements 102–104 to open under the force which exhaust fluid in its associated service passage exerts upon its reduced forward end.

The operation of the directional control unit 160 is similar to that for the unit 16 described earlier. All four valve elements 101, 102, 103 and 104 are held in their closed positions shown in FIGURE 8 when the pilot valve spool is in its neutral position blocking fluid flow into and out of the control ports 122–123. At such times, there is no pressure at the inlet port 36 of the directional control unit, and the check valve elements can be held closed by the pressure of fluid in the service passages 29 and 30 and manifested in their respective chambers 105.

When the pilot spool is shifted to direct control fluid under pressure into the left hand control port 122, the ball check 140 in the associated plunger 131 closes and the plunger is caused to move downwardly to fully communicate the outlet 125 of the chamber 105 for supply check element 101 with the adjacent bore 121. This allows fluid in said chamber to exhaust through the bore 121 to the service passage 29, via lateral passage 126, check valve 129 and passage 127.

It will be understood, of course, that the pressure builds up at the inlet port 36 as soon as the pilot valve spool is shifted out of its neutral position, and that pressure fluid at the inlet port will act to open the supply check 101 by the force it exerts upon the reduced front thereof and cause the fluid in its chamber 105 to be expelled to the adjacent service passage 29.

The other control port 123 is vented through the pilot valve at this time, to allow fluid from the chamber 105 for the exhaust check 104 to exhaust to the reservoir through the central passage in its associated plunger 131.

Hence, pressure fluid from the inlet port 36 can flow past the then open supply check 101 and out through service passage 29 to one end of a double acting cylinder, while fluid expelled from the other end of the cylinder returns through service passage 30 and flows past the then open exhaust check 104 to the exhaust outlet 40.

The exhaust check 102 and the supply check 103 remain closed at times when control port 122 is pressurized and control port 123 is vented as described. These valves are caused to open while supply and exhaust checks 101 and 104 remain closed whenever the pilot spool is shifted to a position pressurizing control port 123 and venting control port 122. In that case, supply fluid flows out through service passage 30 and return fluid enters service passage 29 for flow past then open exhaust check 102 to the exhaust outlet 40.

If the pilot spool is moved to a float position such as described earlier, both control ports 122–123 are vented so that the plungers 131 trap pressure fluid from the service passages in the chambers 105 for the supply checks 101–103 to hold the latter closed, and the chambers for the exhaust checks 102-104 are vented to allow either exhaust check to open under the force which load pressurized return fluid in its adjacent service passage exerts upon its front end. Again, any return fluid flowing past one of the exhaust checks to the exhaust passage 39 can act upon an annular shoulder 142 on the exterior of the other exhaust check to cause the same to open and thereby effect communication of the two service passages with one another. A restricting device 143 near the outlet port, through which the latter is communicated with the exhaust passage 39, facilitates such opening response of the last mentioned exhaust check element.

Because of the float operation described it will be seen that both of the directional control units 16 and 160 will operate satisfactorily with a motor type pilot spool, which in its neutral position, also communicates both control ports with the exhaust outlet in the pilot. It will also be appreciated that because of the restriction in the exhaust passage and the annular external shoulders on the exhaust check elements, the latter can serve as anti-void valves which allow load pressurized return fluid in one service passage to be recirculated back to the other service passage at times when the pressure in the latter drops to a low value at which a void may tend to form in the end of the cylinder to which it connects.

In the event high shock pressures are produced in either service passage 29 or 30, such pressures will also be manifested in the pressure chamber 105 of the adjacent supply check. But these high pressures will be dissipated quickly through the relief passage provided by the slight clearance around the land 135 of the adjacent plunger 131, the bore 121, the passages 126–127 and the check valve plunger 129 associated therewith.

Inching of a load driven by a controlled cylinder is also possible with the directional control unit 160 described. Small amounts of pressure fluid can be selectively diverted to either control port 122–123 by the pilot valve, without necessarily actuating the associated plunger 131, and such fluid will flow to the adjacent service passage through the restricted ports 130, passage 126, check valve plunger 129 and passage 127. Fluid expelled from the cylinder during such inching is returned to the reservoir through the central passage in the exhaust check valve at the opposite side of the unit, as explained hereinbefore.

Figure 9:
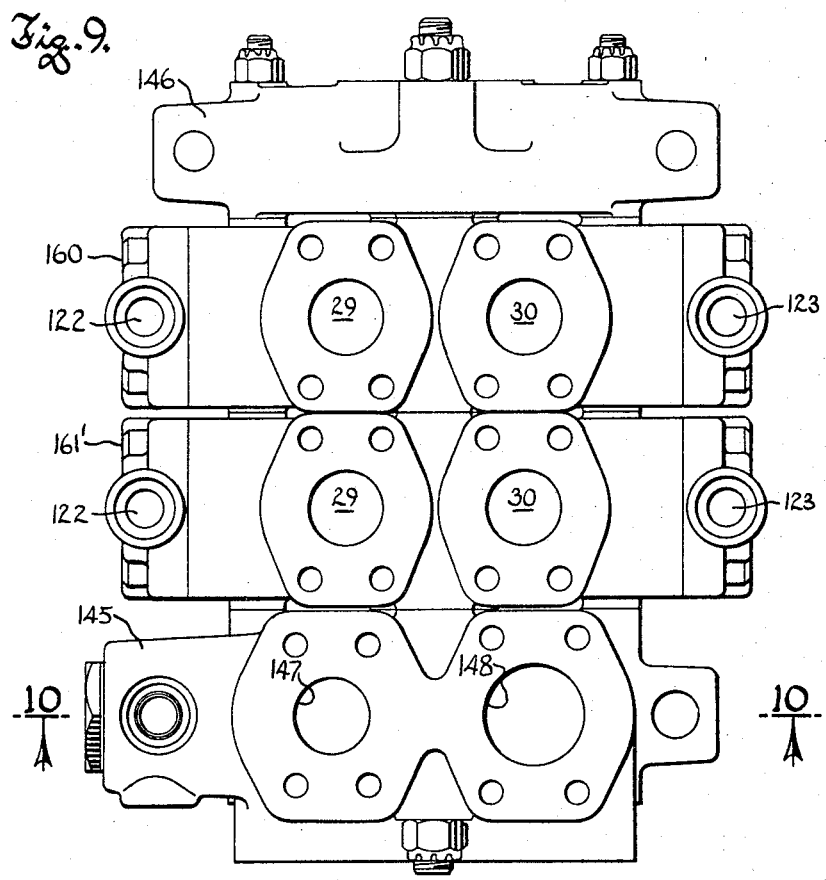
FIGURE 9 is a plan view illustrating a plurality of directional control components such as seen in FIGURE 8, assembled in a stack to provide a valve bank.

The directional control unit 160 is ideally suited for stacking with one or more similar units to provide a control bank, each unit of which is governed by its own pilot valve. A bank comprising two control units 160 and 160', assembled between two end sections 145 and 146, is shown in FIGURE 9. In the example shown, the end section 145 has both the inlet 147 and the outlet 148 of the bank formed therein.

Figure 10:
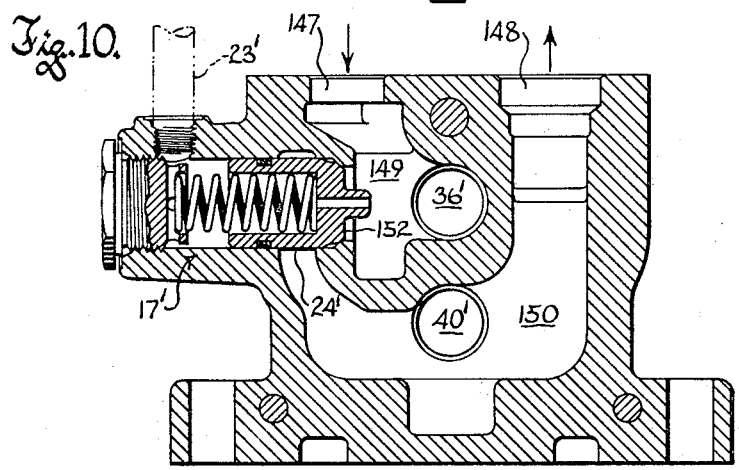
FIGURE 10 is a sectional view through the inlet-outlet section of the bank, taken on the line 10—10 in FIGURE 9.

As can be seen from FIGURE 10, the inlet for the bank opens to an inlet chamber 149 in the end section 145, while the inlet ports of the units 160 and 160' define a supply passage 36' that is communicated with the inlet chamber. Similarly, the outlet 148 for the bank opens to an outlet chamber 150 in the end section 145, and the outlet ports 40 in the two units 160–160' define an exhaust passage 40' leading to the exhaust chamber. The end section 146, of course, closes the inlet and outlet passages 36' and 40' at the other end of the bank.

One of the features of the directional control bank illustrated in FIGURES 9 and 10 is that the end section 145 containing the inlet and outlet of the bank can also have a speed control component 17' built into it to serve both control units. Thus, the pressure responsive valve element 24' of the speed control unit 17' can control a bypass port 152 that communicates the inlet chamber 149 with the outlet chamber 150.

As in my aforesaid Patent No. Re. 26,028, control fluid can be supplied to the pilot valves through the restricted passage in the front of the hollow metering valve element 24' and delivered to the pilots through a control fluid supply line 23' communicating with the chamber in which the valve element 24' operates. The control fluid supply line would serially connect with the pilot inlets, and it would also have parallel connections with the feeder passages in the pilot valves to which pilot inlet fluid is ordinarily diverted upon shifting of the pilot spools from their neutral positions to operating positions blocking their open center passages. As decribed in my aforesaid patent, that arrangement allows the bypass unit 17' to function properly when either of the pilot spools is moved to an operating position, even though the other pilot spool remains in its neutral position.

With the construction described, the valve unit 17' not only serves to regulate the speed of travel of a motor governed by either directional control unit 160 or 160', at the dictation of its pilot valve, but it also acts as a pump unloading valve which is free to open whenever the pilot valve spools are in their neutral position, to bypass pump fluid entering the inlet chamber 149 to the outlet chamber 150.

Figure 11:
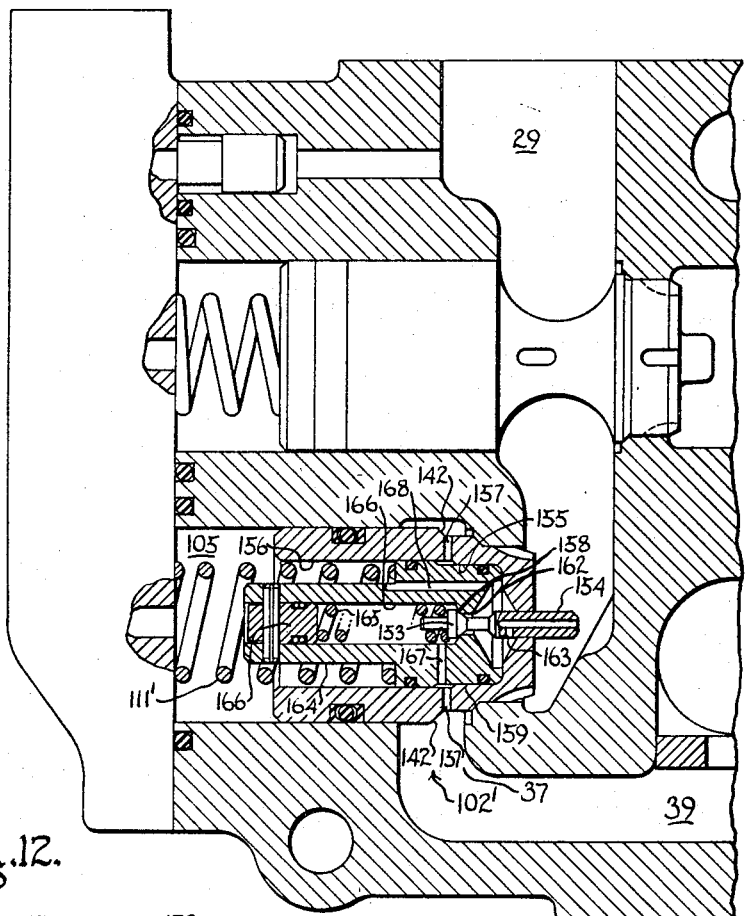
FIGURE 11 is a fragmentary sectional view corresponding to a portion of FIGURE 8, but illustrating how each of its exhaust valve mechanisms can be made to serve as a cylinder port relief valve.

If desired, any of the exhaust valve mechanisms described can incorporate a pilot poppet 153 in its exhaust check element in the manner seen in FIGURE 11, to enable the latter to serve as a cylinder port relief valve for the associated service passage. For purposes of illustration, FIGURE 11 shows the left half of the control unit seen in FIGURE 8, and a relief poppet 153 incorporated in the interior of the exhaust check element 102' thereof to act as a pilot valve therefore.

The pilot poppet is adapted to open whenever the service passage 29 reflects an excessively high pressure condition in the end of the hydraulic cylinder to which it connects, to thus vent the pressure chamber 105 of the exhaust check 102' so that the latter will open under the force which pressure fluid in the service passage 29 exerts upon its reduced inner end. It closes, of course, to effect reclosure of the exhaust check element as soon as the excessively high pressure condition is relieved.

In order to accommodate the pilot poppet, the exhaust check element 102' is somewhat different than those described earlier. It has a central hole in its inner end to freely slidably receive a forwardly projecting tubular stem 154 on the relief poppet 153. This hole opens rearwardly to a first counterbore 155 in the reduced front end portion of the exhaust check element, and the counterbore 155 in turn opens rearwardly to a slightly larger counterbore 156 which extends all the way to the outer end of the exhaust check element. One or more radial holes 157 are drilled through the wall of the exhaust check element at a location just forwardly of its external shoulder 142, and near the bottom of the larger counterbore 156, to communicate with the branch 37 of the exhaust passage 39.

While the seat for the pilot poppet 153 can be formed directly on the exhaust check element 102', it has been here shown as having a seat 158 in the interior of a tubular insert 159 inside the check valve element. The forward end portion of the insert abuts the bottom of the counterbore 155 in the exhaust check element, and it is enlarged to fit the two counterbored portions of the latter, in which it can be suitably sealed by a pair of O-rings as shown.

The seat 158 encircles the rear of a central bore 162 in the forward end portion of the insert, and the stem 154 on the relief poppet extends forwardly through this bore, in spaced relation to its wall. The bore 162 opens to a substantially shallow concavity in the inner end of the insert, and a restricted aperture 163 in the wall of the tubular extension 154 on the relief poppet also opens to that concavity to communicate it with the adjacent service passage 29.

The insert is held in place in the exhaust check element by its spring 111', which encircles a reduced tubular part 164 on the rear of the insert and bears against the enlargement on the forward end portion of the insert. The springs 165 by which the relief poppet 153 is biased toward its seat engaging position is confined in the interior of the tubular part 164 and seats against a plug 166 closing the rear thereof.

One or more radial holes 167 in the wall of the insert communicate the interior of its tubular part 164 with the apertures 157 in the exhaust check element and consequently with the adjacent branch 37 of the exhaust passage 39. The insert also has an axially extending passage 168 therein to communicate the pressure chamber 105 with the bore 162 in the front of the insert.

From this it will be seen that fluid in the service passage 29 can flow into the chamber 105 for the exhaust check element 102' to normally hold the same closed through a passageway that is provided by the tubular extension 154 on the relief poppet, the restricted aperture 163 in the wall of that tubular extension, the concavity in the front of the insert 159, and the axial passage 168 in the enlarged forward portion thereof. Hence, the pressure fluid in chamber 105 will maintain the exhaust check element closed until the chamber is either vented through the pilot valve as described hereinbefore, or until an excessively high pressure condition in the service passage 29 and manifested at the mouth of the bore 162 in the hollow front portion of the insert 159 causes unseating of the relief poppet 153. The relief poppet normally closes a second exhaust path leading from the chamber 105 to the exhaust passage 39 in the directional control unit, and comprised of the axial passage 168, the concavity or hollow in the front end of the insert, the bore 162 thereof, the interior of the insert rearwardly of its seat 158, and the registering ports 167 and 157 in the walls of the insert and the exhaust check element, respectively.

An exhaust valve mechanism with a relief or pilot poppet such as described, of course, could be used advantageously in the inlet section of the stacked valve shown in FIGURES 9 and 10, in place of the unloading valve 17' therein shown.

Figure 12:
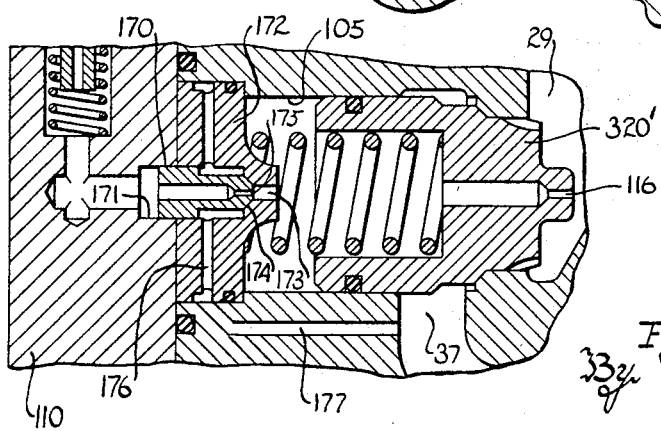
FIGURE 12 is a fragmentary sectional view of another exhaust valve mechanism of this invention, showing how its pressure chamber can be vented to an exhaust passage in the valve body.

The chambers 105 for the exhaust check elements described are normally vented to the reservoir through their control ports and the passages in the pilot valve. FIGURE 12, however, discloses an exhaust valve mechanism which incorporates a miniature version 170 of its exhaust check element 320' to enable normal venting of the pressure chamber 105 to the adjacent branch 37 of the exhaust passage in the body of the directional control unit.

The small check valve element 170 is slidably mounted in a bore 171 formed partly in the adjacent end cover 110 and partly in an insert 172 that is confined in an enlarged outer portion of the chamber 105 by the cover. This bore opens forwardly into the chamber 105 through a reduced passage 173 which, at its junction with the bore, defines an outwardly facing valve seat 174. At its rear, the bore 171 opens to the lateral passage 124 in the adjacent cover, so as to be communicable with the pilot control port in said cover.

The check valve element 170 is of tubular construction, having a reduced inner end portion which is engageable with the seat 174, and a restricted passage 175 through its front which is slightly larger in diameter than the restricted port 116 in the front of the larger check valve element 320'. One or more radial passages 176 in the insert 172 communicate with the bore 171 at a location opposite the reduced inner end portion of the element 170 and with a passageway 177 in the valve body leading to the branch 37 of the exhaust passage. The passageway 177 and the radial passages 176 communicate the interior of the pressure chamber 105 with the exhaust passage branch 37 when the small check valve element 170 is moved rearwardly off of its seat, to thus vent the chamber and permit the exhaust check element 320' to open under force which pressure fluid in the associated service passage exerts upon its reduced front end.

Whenever the spool in the pilot valve (not shown) is moved to a position closing the control port associated with the small check valve element 170, pressure fluid from the adjacent service passage 29 flows through the large valve element 320' to its chamber 105, and from there through the passage 175 in the front of the small check element 170 into the bore behind it, to hold it closed. This will also serve to maintain the main exhaust check valve element 320' closed. As soon as the associated pilot control port is vented through the pilot valve, the small check element 170 opens because of the lack of pressure in its bore 171 and the high pressure acting upon its reduced front end. Fluid in chamber 105 can then exhaust through the passages 176 and passageway 177 to the adjacent branch 37 of the exhaust passage, to allow the main exhaust check element 320' to open.

From the foregoing description, together with the accompanying drawings it will be apparent to those skilled in the art that this invention provides an improved pilot operated poppet type control valve mechanism that can be governed by a pilot valve of any conventional construction, and which pilot valve can be operated manually, hydraulically, mechanically, electrically, or by air pressure.

What is claimed as my invention is:

1. Control valve instrumentalities for selectively communicating a service duct with either fluid supply or exhaust lines, comprising the combination of:
   (A) a fluid pressure responsive exhaust valve mechanism normally closing off the service duct from the exhaust line and adapted to open in response to force exerted upon one surface thereof by pressure fluid in the service duct;
   (B) a fluid pressure responsive supply valve mechanism normally closing off the service duct from the supply line and adapted to open in response to force exerted upon a first surface thereof by pressure fluid in the supply line;
   (C) means associated with the exhaust valve mechanism for imposing upon a larger surface thereof the pressure of fluid in the service duct so as to hold the same closed except at times when the fluid pressure acting upon its said larger surface is relieved;
   (D) means associated with the supply valve mechanism for imposing upon a larger surface thereof the pressure of fluid in the supply line so as to hold the same closed except at times when the fluid pressure acting upon its said larger surface is relieved;

(E) means defining relief passages, one for each of said valve mechanisms, through which said fluid pressures holding the same closed can be relieved;

(F) valve elements, one for each of said relief passages, to govern relief of fluid pressures holding said valve mechanisms closed;

(G) and control means for said valve elements operable to effect closure of either of said relief passages by its associated valve element while concurrently effecting opening of the other relief passage by its associated valve element.

2. Control valve instrumentalities comprising the combination of claim 1, including a second service duct which is selectively communicable with the supply and exhaust lines by a duplication of the means recited in paragraphs A through F; and wherein said control means of paragraph G is operable to effect closure of either of the duplicated relief passages by the valve element therefor at times when said control means effects opening of its counterpart relief passage of paragraph E, and to concurrently effect opening of the other of the duplicated relief passages by the valve element therefor at times when the control means effects closure of its counterpart relief passage of paragraph E.

3. Control valve instrumentalities comprising the combination of claim 1, wherein said control means recited in paragraph G comprises a pilot mechanism which is operatively associated with the valve elements and which affords control of the same from a location remote therefrom.

4. Control valve instrumentalities comprising the combination of claim 2, wherein said control means comprises a pilot mechanism common to all of said valve elements.

5. Control valve instrumentalities comprising the combination of claim 3, wherein said valve elements are pressure responsive; and wherein the pilot mechanism is a pilot valve that controls the pressure by which the valve elements are actuated.

6. Control valve instrumentalities comprising the combination of claim 1, further characterized by means associated with the supply valve mechanism for also imposing upon said larger surface thereof the pressure of fluid in the service duct whereby the supply valve mechanism can be held closed thereby at times when low pressure obtains in the supply line.

7. Control valve instrumentalities for selectively communicating a service duct with either a supply line or an exhaust line, comprising the combination of:

(A) means providing a fluid pressure actuatable supply valve mechanism for closing off the service duct from the supply line, and which is adapted to open in response to force exerted directly thereon by pressure of fluid in the supply line;

(B) means providing a fluid pressure actuatable exhaust valve mechanism for closing off the service duct from the exhaust line, and which is adapted to open in response to pressure of fluid in the service duct;

(C) first and second pressure chambers operatively associated with said supply and exhaust valve mechanisms, respectively, and into which pressure fluid can flow to prevent opening of their associated valve mechanisms;

(D) means for supplying the first pressure chamber with pressure fluid, comprising passage means communicating said first pressure chamber with the supply line;

(E) means for supplying the second pressure chamber with pressure fluid from the service duct;

(F) means providing an outlet for each chamber, through which fluid therein must exit in order to enable opening of its associated valve mechanism;

(G) and means governing exit of fluid from said chambers through their respective outlet means, said last named means comprising fluid pressure actuatable means movable relative to the supply and exhaust valve mechanisms.

8. Control valve instrumentalities for selectively communicating a service duct with either a supply line or an exhaust line, comprising the combination of:

(A) means providing a fluid pressure actuatable supply valve mechanism for closing off the service duct from the supply line, and which is adapted to open in response to force exerted directly thereon by pressure of fluid in the supply line;

(B) means providing a fluid pressure actuatable exhaust valve mechanism for closing off the service duct from the exhaust line, and which is adapted to open in response to pressure of fluid in the service duct;

(C) first and second pressure chambers operatively associated with said supply and exhaust valve mechanisms, respectively;

(D) means communicating the first pressure chamber with the supply line;

(E) means communicating the second pressure chamber with the service duct;

(F) means providing an outlet for each chamber, through which fluid therein must exit in order to enable opening of its associated valve mechanism;

(G) means defining a control port which is commonly communicated with the outlet means for both of said chambers;

(H) first fluid pressure responsive valve means governing the outlet means for said first chamber and movable from a normal outlet closing position to an open position in response to pressure of fluid at the control port;

(I) and second fluid pressure responsive valve means governing the outlet means for said second chamber and adapted to be maintained in an outlet closing position in response to said pressure of fluid at the control port.

9. Control valve instrumentalities comprising the combination of claim 8, wherein said first fluid pressure responsive valve means has a passage therethrough providing part of the outlet means for the exhaust valve chamber; and wherein said second fluid pressure responsive valve means comprises a check valve in said passage.

10. Control valve instrumentalities comprising the combination of claim 8, further including a pilot valve mechanism connected with said control port to govern said first and second fluid actuatable valve means.

11. Control valve instrumentalities comprising the combination of claim 10, further characterized by the pilot valve having:

(A) an inlet for control fluid under pressure, (B) an exhaust outlet, (C) a service port which is communicated with said control port, (D) and a movable valve element which in one operating position directs pressurized control fluid entering said inlet to the service port for flow to said control port, and which in another operating position communicates the service port with the exhaust outlet so as to vent said control port and thereby effect return of said first fluid pressure actuatable valve means to its normal outlet closing position while permitting fluid to exhaust through the outlet means for the second chamber.

12. Control valve instrumentalities comprising the combination of claim 11, further characterized by the following:

(A) that said second fluid pressure actuatable valve means is a check valve which is adapted to open whenever the control port is vented to allow fluid to be expelled from said second chamber through the control port;

(B) that said outlet means for the first chamber leads to the service duct through a branch passage which at all times has restricted communication with the control port;

(C) and that a check valve in said branch passage, between its point of restricted communication with the control port and the service duct, allows pressure fluid from said first chamber to flow to the service duct but prevents reverse flow through said branch passage.

13. In a control valve device for governing flow of pressurized supply fluid through a service line to a fluid motor and for governing exhaust flow of fluid from the motor through said service line, the combination of:
(A) means providing a normally closed fluid pressure controlled supply valve mechanism for the service line to control flow of supply fluid therethrough;
(B) means providing a normally closed fluid pressure controlled exhaust valve mechanism for the service line to control flow of exhaust fluid therethrough;
(C) a control port commonly associated with both of said pressure controlled valve mechanisms;
(D) and fluid pressure responsive valve members, one for each of said valve mechanisms, rendered operative to effect concurrent opening of the exhaust valve mechanism and closure of the supply valve mechanism in consequence of low pressure at the control port, and being rendered operative to concurrently effect opening of the supply valve mechanism and closure of the exhaust valve mechanism in consequence of the pressure at the control port reaching a predetermined high value.

14. In a control valve device for governing flow of pressurized supply fluid through a service line to a fluid motor and for governing exhaust flow of fluid from the motor through said service line, the combination of:
(A) means providing a normally closed fluid pressure controlled supply valve mechanism for the service line to control flow of supply fluid therethrough;
(B) means providing a normally closed fluid pressure controlled exhaust valve mechanism for the service line to control flow of exhaust fluid therethrough;
(C) a pilot valve mechanism having an inlet port connectable with a source of control fluid under pressure, an exhaust port, a control port, and a movable valve element to control communication between said ports and thereby govern the pressure at the control port;
(D) means controlled by the pilot valve mechanism and cooperating with the supply and exhaust valve mechanisms to govern opening of the latter valve mechanisms in accordance with the pressure obtaining at said pilot control port, said last named means comprising instrumentalities rendered operative to effect concurrent opening of the exhaust valve mechanism and closure of the supply valve mechanism in consequence of the low pressure obtaining at the pilot control port when the latter is in communication with the pilot exhaust port, and being rendered operative to concurrently effect opening of the supply valve mechanism and closure of the exhaust valve mechanism in consequence of the pressure at the pilot control port reaching a predetermined high value;
(E) passage means providing restricted communication between the pilot control port and the service line;
(F) and a check valve in said passage means arranged to open to permit fluid to flow to the service line from the pilot control port.

15. In a control valve instrumentality having a body provided with a service passage and inlet and outlet passages that are communicable with the service passage, means in the body to govern communication between the service passage and the inlet and outlet passages, comprising:

(A) a pressure actuatable supply valve to govern fluid flow from the inlet passage to the service passage and adapted to open in the direction of fluid flow to the servie passage in response to pressure of fluid in the inlet passage;
(B) a pressure actuatable exhaust valve to govern fluid flow from the service passage to the outlet passage and adapted to open in the direction of fluid flow to the outlet passage in response to pressure of fluid in the service passage;
(C) a pair of pressure chambers, one for each of said valves and having controllable outlet means and a movable wall portion operatively associated with its valve and effective to hold the same closed in response to pressure of fluid in the chamber except at times when its outlet means is open;
(D) duct means through which each of said chambers can be supplied with pressure fluid, the duct means for the supply valve chamber communicating with the inlet passage, and the duct means for the exhaust valve chamber communicating with the service passage;
(E) said body having a control port;
(F) and fluid pressure responsive valve means to control the outlet means for said pressure chambers in accordance with the pressure at said control port, said valve means being concurrently operable to effect closure of the outlet means for one of said chambers and opening of the outlet means for the other chamber in response to pressurization of said control port, and being concurrently operable to effect closure of the outlet means for said other chamber and opening of the outlet means for said one chamber in response to venting of said control port.

16. The control valve instrumentality of claim 15, wherein the outlet means for the supply valve chamber comprises passage means that communicates with the control port and with the service passage; wherein a check valve in said passage means blocks reverse flow of fluid from the service passage to the control port; and wherein said fluid pressure responsive valve means comprises a valve plunger which normally occupies a position blocking the outlet means for the supply valve chamber and is moved out of said blocking position in response to pressurization of the control port.

17. Control valve instrumentalities comprising the combination of:
(A) a main valve mechanism having an inlet connectable with a main source of fluid under pressure, a service passage, and a normally closed fluid pressure responsive valve element to control fluid flow from the inlet to the service passage;
(B) a pilot valve mechanism having an inlet port connectible with a source of control fluid under pressure, a control port, and a movable valve member to control communication between said ports and by which the pressure at said control port can be regulated;
(C) means controlled by the pilot valve and operatively associated with the main valve mechanism for effecting opening of the valve element thereof in response to fluid pressure in excess of a predetermined value at the pilot control port to thereby provide for flow of main source fluid to the service passage;
(D) and means for delivering pressurized control fluid from the pilot control port to the service passage at times when the pressure at the control port is below the value required to effect opening of the main valve element.

18. Control valve instrumentalities for a hydraulic motor, comprising the combination of:
(A) means defining main and auxiliary ducts through which source fluid under pressure can be supplied to a fluid motor;
(B) a normally closed fluid pressure responsive main valve mechanism to control flow of source fluid through the main duct;

(C) a pilot valve mechanism having an inlet port to receive source fluid under pressure, a control port connecting with the auxiliary duct, and a movable valve member to control communication between said ports and by which the pressure of fluid at the control port can be regulated;

(D) and fluid pressure responsive means operatively associated with the pilot control port and with the main valve mechanism and operable in response to fluid pressure at the pilot control port in excess of a predetermined high value to effect opening of the main valve mechanism to thereby cause source fluid to flow through the main duct, and being operable as a consequence of reduction of fluid pressure at the pilot control port to a value below that required for opening of the main valve mechanism to effect flow of pressure fluid from the pilot control port through the auxiliary duct.

19. A control valve comprising a body having a service passage and inlet and outlet passages with which the service passage is communicable, means in the body to control communication between the service passage and the inlet and outlet passages, characterized by:

(A) a fluid pressure responsive exhaust valve mechanism normally closing off the service passage from the outlet passage and adapted to open in response to pressure which fluid in the service passage exerts on one portion of said mechanism;

(B) a fluid pressure responsive supply valve mechanism normally closing off the service passage from the inlet passage and adapted to open in response to pressure which fluid in the inlet passage exerts on a first portion thereof;

(C) control instrumentalities governing the exhaust valve mechanism and comprising means for translating the pressure of fluid in the service passage into closing force on another portion of the exhaust valve mechanism, which closing force must be relieved before the exhaust valve mechanism can open;

(D) and control instrumentalities governing the supply valve mechanism and comprising means for translating the pressure of fluid in both the inlet passage and the service passage into closing force on a second portion of the supply valve mechanism, which closing force must be relieved before the supply valve mechanism can open, and whereby the supply valve mechanism can be held closed by force derived from pressure fluid in the service passage even though fluid pressure in the inlet passage drops to a low value.

20. A control valve instrumentality having a body provided with an inlet passage, an outlet passage, and a pair of service passages each of which is communicable with either the inlet passage or the outlet passage, characterized by means in the body to govern communication between each service passage and the inlet and outlet passages, said means comprising:

(A) a pair of normally closed fluid pressure actuatable valve mechanisms for each service passage, one valve mechanism of each pair thereof comprising a supply valve which is adapted to be opened by fluid pressure in the inlet passage to communicate its service passage therewith, and the other valve mechanism of each pair thereof comprising an exhaust valve which is adapted to be opened by fluid pressure in its service passage to communicate the same with the outlet passage;

(B) valve actuating means associated with each of said supply valves for normally holding the same closed in response to force derived from pressure fluid in the inlet passage;

(C) valve actuating means associated with each of said exhaust valves for normally holding the same closed in response to force derived from pressure fluid in its associated service passage;

(D) and valve control means associated with each pair of said valve mechanisms and with the valve actuating means therefor to provide for selectively relieving either valve mechanism of the pair of the force holding the same closed.

21. The control valve instrumentality of claim 20 wherein said valve control means for each pair of valve mechanisms comprises instrumentalities that cooperate with the corresponding valve actuating means to normally maintain the same operative to hold their respective valve mechanisms closed.

22. The control valve instrumentality of claim 20 further characterized by:

(A) a pair of control ports in the valve body, one for each pair of valve mechanisms;

(B) and wherein said valve control means are governed by pressure at the control ports for said pairs of valve mechanisms.

23. The control valve instrumentality of claim 22, wherein said valve control means for each pair of valve mechanisms comprises means responsive to pressure of a predetermined high value at its associated control port for effecting opening of its associated supply valve while maintaining its associated exhaust valve closed, and responsive to pressure of a predetermined low value at its associated control port for effecting opening of its associated exhaust valve and closure of its associated supply valve.

24. The control valve of claim 20, further characterized by means for additionally imposing upon the valve actuating means for each supply valve mechanism the pressure of fluid in its associated service passage, whereby each of said last named valve actuating means is normally operative to hold its supply valve mechanism closed despite loss of pressure in the inlet passage.

25. Control valve instrumentalities for governing flow of pressure fluid from upstream to downstream portions of a duct, comprising the combination of:

(A) means in the duct defining an annular valve seat which faces in the downstream direction;

(B) a pressure actuatable valve mechanism normally engaging said seat to close the duct but movable off of its seat in the direction of fluid flow in the duct in response to pressure of fluid in the duct upstream from the valve seat;

(C) means for translating fluid pressure obtaining in the duct at a location upstream from said seat into a closing force on the valve mechanism, which closing force must be relieved before the valve mechanism can open;

(D) and control means for said valve mechanism comprising a pressure responsive relief valve member which is adapted to be actuated by a fluid pressure force independent of the force made available by pressure fluid in said duct from a first position which said member must occupy in order for said closing force on the valve mechanism to be effective, to a second position at which said member effects relief of said closing force on the valve mechanism.

26. The control valve instrumentalities of claim 25, wherein said means of paragraph C thereof comprises a pressure chamber having an inlet connecting with the duct to receive pressure fluid therefrom and with which chamber the valve mechanism is operatively associated to be held in a duct closing position in consequence of pressure of fluid in the chamber; wherein said chamber has an outlet through which fluid therein can exit to relieve the closing force on the valve mechanism; and wherein said pressure responsive relief valve member governs the outlet of the chamber.

27. The control valve instrumentalities of claim 26, wherein said valve mechanism opens to an extent proportional to the rate at which fluid can flow out of the chamber; and wherein said pressure responsive control member comprises a valve plunger which is biased to a position closing the chamber outlet but is actuatable away from said outlet closing position an extent proportional to the pressure applied to the plunger to actuate the same.

28. The combination of claim 26, wherein said pressure chamber is communicated with the upstream portion of the duct through a passage which extends through a front portion of the valve mechanism; and further characterized by check valve means governing said passage and adapted to open to permit fluid to flow into the chamber from the upstream portion of the duct but to block reverse flow through said passage.

29. The combination of claim 28, further characterized by the following:
  (A) means on the rear of the valve mechanism defining a piston which is slidably received in said chamber and has a diameter greater than that of said seat, said piston having a surface upon which fluid in the downstream portion of the duct can exert force tending to open the valve mechanism;
  (B) means defining a passageway communicating the downstream portion of the duct with said chamber to enable the piston to hold the main valve closed at times when fluid pressure in the downstream portion of the duct exceeds the fluid pressure in the upstream portion of the duct;
  (C) and check valve means governing said passageway, adapted to open to permit fluid flow into said chamber from the downstream portion of the duct but to block reverse flow through said passageway.

30. The combination of claim 29, further characterized by the following:
  (A) that said piston is hollow and opens rearwardly to said chamber;
  (B) that the hollow interior of the piston defines a coaxial check valve compartment, a larger diameter spring receiving compartment rearwardly of the check valve compartment, and a rearwardly facing annular ledge at the junction of said compartments;
  (C) an apertured disc seated against said ledge;
  (D) a compression spring confined between said disc and the wall of the chamber opposite the same to urge the main valve forwardly toward its closed position;
  (E) and wherein said check valve means for said passage and said passageway are loosely confined in the check valve compartment by said apertured disc.

31. The combination of claim 26, further characterized by means defining an exhaust passage which communicates the chamber outlet with the downstream portion of the duct; and further characterized by a one-way valve in said exhaust passage, adapted to open to permit fluid expelled from the chamber to flow to the downstream portion of the duct.

32. The combination of claim 31, wherein said pressure responsive member normally closes said exhaust passage but is adapted to provide for seepage of pressure fluid from the chamber to the downstream portion of the duct at a rate substantially less than pressure fluid is permitted to flow into the chamber.

33. In valve mechanism having a body with a duct therein, means in the body for controlling flow of pressure fluid from upstream to downstream portions of the duct comprising the combination of:
  (A) a main valve which is biased toward a position closing off communication between the upstream and downstream portions of the duct, and which opens in the downstream direction in response to pressure of fluid in the upstream portion of the duct;
  (B) means providing a pressure chamber which is operatively associated with the main valve and is communicated with the upstream portion of the duct to be supplied with pressure fluid therefrom, said chamber having outlet means through which its pressure fluid must exhaust in order to enable opening of the main valve;
  (C) a fluid pressure responsive auxiliary valve governing said outlet means and normally closing the same;
  (D) and means defining a control port which is operatively associated with the auxiliary valve and which is connectable with a source of pressurized control fluid externally of the body to provide for actuation of the auxiliary valve out of its normally closed position from a point remote from the main valve.

34. Control valve instrumentalities, comprising:
  (A) a main valve having supply and outlet passages and a pair of service passages each of which is communicable with either the supply passage or the outlet passage;
  (B) means in the main valve defining a pair of normally closed fluid pressure actuatable valve mechanisms for each service passage, one valve mechanism of each pair thereof providing a supply valve which is adapted to be opened by fluid pressure in the supply passage to communicate its service passage therewith, and the other valve mechanism of each pair thereof providing an exhaust valve which is adapted to be opened by fluid pressure in its service passage to communicate the same with the outlet passage;
  (C) a pilot valve mechanism for controlling actuation of said valve mechanisms, said pilot valve mechanism having
    (1) an inlet for control fluid under pressure, exhaust outlet means, a pair of control ports, one for each pair of said valve mechanisms, and a valve element which is movable to first and second positions to in turn pressurize each of the control ports from the inlet and to vent the other control port to the outlet means, and said valve element being movable to a third position at which it vents both control ports through the exhaust outlet means;
  (D) means rendered effective in consequence of pressurization of each control port for effecting opening of its associated supply valve;
  (E) and means rendered effective in consequence of venting of each control port to provide for opening of its associated exhaust valve.

35. Control valve means for a double acting lift cylinder, for governing fluid flow through either of a pair of service lines from a supply line and for governing return flow through the other service line to a reservoir line, comprising:
  (A) a pair of fluid pressure actuatable valve mechanisms for each service line, one such mechanism providing a normally closed supply valve capable of being opened by pressure of fluid in the supply line to allow supply fluid to flow to the service line, and the other such mechanism providing an exhaust valve capable of being opened by pressure of return fluid in the service line to allow return fluid to flow to the reservoir line;
  (B) means defining a pair of control ports, one for each pair of valve mechanisms;
  (C) means responsive to pressurization of each control port for effecting opening of the associated supply valve mechanism;
  (D) means responsive to venting of each control port for effecting opening of each exhaust valve mechanism;
  (E) a pilot valve mechanism operatively connected with said control ports and having a movable valve element for selectively pressurizing and venting said control ports and which in one position effects venting of both control ports to permit either exhaust valve to open in consequence of pressure of return fluid thereon;
  (F) and means on each exhaust valve mechanism upon which reservoir fluid can act to open the valve at times when both control ports are vented.

36. Control valve instrumentalities for governing flow of pressurized supply fluid through a service line to a fluid motor and for governing return flow of fluid from the motor through said service line, comprising:
(A) a fluid pressure controlled supply valve mechanism normally blocking flow of supply fluid through the service line;
(B) a fluid pressure controlled exhaust valve mechanism normally blocking flow of return fluid through the service line;
(C) means providing a control port common to said supply and exhaust valve mechanisms;
(D) and means for governing opening of said supply and exhaust valve mechanisms in accordance with the pressure obtaining at said control port, said last named means comprising instrumentalities rendered operative to effect concurrent closure of the exhaust valve mechanism and opening of the supply valve mechanism in consequence of high pressure at the control port, and being rendered operative to concurrently effect closure of the supply valve mechanism and opening of the exhaust valve mechanism in consequence of low pressure at the control port.

37. The control valve instrumentalities of claim 36, further characterized by the following:
(A) a chamber operatively associated with the supply valve mechanism and pressurized by fluid from the supply line to normally hold the supply valve mechanism closed, said chamber having an outlet through which fluid must exit to permit the supply valve mechanism to open;
(B) a pressure chamber operatively associated with the exhaust valve mechanism and pressurized by fluid from the service line to normally hold the exhaust valve mechanism closed, said last named chamber having an outlet through which fluid must exit to permit the exhaust valve mechanism to open;
(C) and said instrumentalities controlling fluid flow through the outlets of said pressure chambers to govern opening and closing of the supply and exhaust valve mechanisms in accordance with the pressure at the control port.

38. The control valve instrumentalities of claim 37, further characterized by:
(A) said chamber for the exhaust valve mechanism being also communicated with a vent passage;
(B) and a normally closed pilot poppet for the exhaust valve mechanism and governing said vent passage, said pilot poppet being sensitive to the pressure obtaining in the service line and being adapted to open in response to rise in pressure therein to a predetermined relief value to vent the chamber for the exhaust valve mechanism and permit opening of the latter regardless of the pressure obtaining at the control port.

39. The control valve instrumentalities of claim 38, wherein said pilot poppet is mounted in the exhaust valve mechanism.

40. Control valve instrumentalities, comprising:
(A) poppet-like fluid pressure actuable supply valve means to govern flow of pressurized supply fluid through a service line;
(B) poppet-like fluid presure actuable exhaust valve means to govern flow of return fluid in the service line;
(C) means to selectively control opening and closing of said supply and exhaust valve means;
(D) and other means embodied in said exhaust valve means for effecting opening thereof in response to rise in pressure in the service line to a predetermined relief valve.

41. Control valve instrumentalities for governing flow of pressurized fluid from a supply line to a service line and for governing return flow of fluid from the service line to an exhaust line, comprising the combination of:
(A) normally closed supply valve mechanism to control communication between the supply and service lines;
(B) normally closed exhaust valve mechanism to control communication between the service and exhaust lines;
(C) a control port common to said valve mechanisms;
(D) means rendered operative in response to fluid in said control port at a pressure above a predetermined high value for effecting opening of the supply valve mechanism and for preventing opening of the exhaust valve mechanism, said means being operative at times when the pressure of fluid at the control port drops to a low value to effect opening of the exhaust valve mechanism and to prevent opening of the supply valve mechanism;
(E) and means to conduct fluid from the control port to the service line at times when neither valve mechanism is open.

42. Control valve instrumentalities comprising the combination set forth in claim 41, wherein said last named means (paragraph E) comprises a passageway communicating the control port with the service line and leading through the exhaust valve mechanism.

43. Control valve instrumentalities for governing flow of pressurized fluid from a supply line to a service line and for governing return flow of fluid from the service line to an exhaust line, comprising:
(A) a pair of normally closed valve mechanisms, one controlling communication between the supply and service lines, and the other controlling communication between the service and exhaust lines;
(B) means providing a pair of chambers, one for each of said valve mechanisms, normally containing fluid under pressure and from which pressure fluid must exit in order to enable opening of their respective valve mechanisms;
(C) outlet means for each chamber, through which pressure fluid therein can exit, the outlet means for the exhaust valve chamber communicating with the exhaust line at a location adjacent to the exhaust valve mechanism;
(D) control port means associated with said pressure chambers;
(E) and valve means governing said outlet means in accordance with the pressure of fluid at the control port means.

44. The control valve instrumentalities of claim 43, wherein the outlet means for the supply valve chamber leads to the service line.

45. Control valve means for governing flow of pressure fluid from a supply duct to either of a pair of service ducts and for governing return flow from the service ducts to a return duct through an exhaust duct common to the service ducts, comprising:
(A) a pair of pressure actuatable valve mechanisms for each service duct providing a poppet-like supply valve normally closing off each service duct from the supply duct but capable of being opened by pressure of fluid in the supply duct, and a poppet-like exhaust valve normally closing off the exhaust duct from each service duct and capable of being opened by pressure of fluid in the later;
(B) means defining a pair of control ports, one for each pair of said valve mechanisms;
(C) a pressure chamber in which each of said valves operates, and in which fluid under pressure normally holds said valves closed, said chambers having outlets through which fluid can be expelled therefrom to enable the valves to open;
(D) means controlling flow of fluid from the chambers through their respective outlets in accordance with pressure conditions at said control ports;

(E) means on each exhaust valve to cause either thereof to open in response to pressure of fluid in said exhaust duct at times when the other exhaust valve is opened by pressure of fluid in its associated service duct;

(F) and means restricting fluid flow from the exhaust duct to the return duct.

References Cited

UNITED STATES PATENTS

| | | | |
|---|---|---|---|
| Re. 26,028 | 5/1966 | Tennis | 60—52 |
| 2,569,881 | 10/1951 | Daries | 137—596.15 X |
| 2,583,185 | 1/1952 | McLeod | 137—596.15 |
| 3,180,355 | 4/1965 | Long | 137—491 |

FOREIGN PATENTS 549,385  10/1956  Italy.

M. CARY NELSON, *Primary Examiner.*

R. J. MILLER, *Assistant Examiner.*

UNITED STATES PATENT OFFICE
CERTIFICATE OF CORRECTION

Patent No. 3,411,536                                                        November 19, 1968

Francis H. Tennis

It is certified that error appears in the above identified patent and that said Letters Patent are hereby corrected as shown below:

Column 5, line 34, "longthwise" should read -- lengthwise --. Column 8, line 41, "42'" should read -- 42 --; line 66, after "cyclinder." insert -- 15. --. Column 27, line 73, "valve" should read -- value --.

Signed and sealed this 10th day of March 1970.

(SEAL)
Attest:

Edward M. Fletcher, Jr.                                       WILLIAM E. SCHUYLER, JR.
Attesting Officer                                                  Commissioner of Patents